US008684113B1

(12) United States Patent
Laconis

(10) Patent No.: US 8,684,113 B1
(45) Date of Patent: Apr. 1, 2014

(54) ATTACHABLE, POWERED DRIVE APPARATUS FOR WHEELCHAIRS

(71) Applicant: Gregory Edward Laconis, Houston, TX (US)

(72) Inventor: Gregory Edward Laconis, Houston, TX (US)

( * ) Notice: Subject to any disclaimer, the term of this patent is extended or adjusted under 35 U.S.C. 154(b) by 0 days.

(21) Appl. No.: 13/774,730

(22) Filed: Feb. 22, 2013

Related U.S. Application Data

(60) Provisional application No. 61/634,458, filed on Feb. 28, 2012.

(51) Int. Cl.
*B62M 7/14* (2006.01)

(52) U.S. Cl.
USPC .................. 180/11; 180/12; 180/13; 180/15; 180/16; 280/304.1; 280/250.1

(58) Field of Classification Search
USPC ................ 180/11, 12, 13, 15, 16; 280/304.1, 280/250.1
See application file for complete search history.

(56) References Cited

U.S. PATENT DOCUMENTS

| | | | | | |
|---|---|---|---|---|---|
| 4,386,672 | A * | 6/1983 | Coker | 180/13 |
| 5,113,959 | A * | 5/1992 | Mastov et al. | 180/11 |
| 5,494,126 | A * | 2/1996 | Meeker | 180/13 |
| 5,826,670 | A * | 10/1998 | Nan | 180/15 |
| 5,878,829 | A | 3/1999 | Kanno et al. | |
| 6,883,632 | B2 | 4/2005 | McHardy et al. | |
| 6,938,711 | B2 * | 9/2005 | Kime et al. | 180/11 |
| 6,974,399 | B2 | 12/2005 | Lo | |
| 7,306,250 | B1 | 12/2007 | Mills | |
| 7,520,519 | B2 | 4/2009 | Smurthwaite, Jr. | |
| 7,556,274 | B2 | 7/2009 | Mittelstaedt | |
| 7,694,991 | B2 | 4/2010 | Mills et al. | |
| 7,976,049 | B2 * | 7/2011 | Chiu | 280/304.1 |
| 2008/0115982 | A1 * | 5/2008 | Lin | 180/13 |
| 2008/0197598 | A1 | 8/2008 | Mills et al. | |
| 2010/0012400 | A1 * | 1/2010 | Patmont et al. | 180/12 |
| 2010/0300777 | A1 | 12/2010 | Tallino | |
| 2012/0279789 | A1 | 11/2012 | Brill et al. | |

* cited by examiner

*Primary Examiner* — Joseph M Rocca
*Assistant Examiner* — Marlon Arce

(57) ABSTRACT

A device for adapting a manual wheelchair to drive with a powered wheel is disclosed. The device attached to the wheelchair provides means for raising the wheelchair front caster wheels and simultaneously having the powered wheel contact the driving surface. The disclosed device may be rotated so that the powered wheel lifts from the surface as the front caster wheels are lowered to contact the driving surface enabling manual operation of the wheelchair. The disclosed device includes a mechanism for steering the powered wheel, controls for varying the forward or backward speeds and braking. The device may be detached from the chair and is adaptable to fit a large variety of wheelchairs with capability for ergonomically adjusting the steering column for the comfort of the user. Optional human interface devices may be incorporated so the chair occupant may control speed and steering by operating a joystick, head array or other such devices.

9 Claims, 31 Drawing Sheets

ATTACHABLE, POWERED DRIVE APPARATUS FOR WHEELCHAIRS

Joy stick controls have been popular where direction and speed are provided by the position of a universal motion joy-stick. In the case of the disclosed apparatus, left or right joy-stick movement would control steering the wheel driver hub. Forward or back joy-stick movement would control the speed of the wheel driver hub in the forward or backward rotation.

Voice-controlled wheelchairs have also been proposed, but the variety and precision of the control they afforded has been less desirable. Furthermore, there has been a problem with commands being heard by the control system and the potential for the control system responding to a false command picked up from ambient noise, such as from the voices of people around the wheelchair.

There are other methods for controlling wheelchair movement and are well documented in the art. Those skilled in the art will be familiar with modular or integral control systems and, in addition to those systems discussed above, will have knowledge of controls using movements of the chin, head, finger, touch pads, wafer boards, proximity switches as well as remote radio controls and/or voice commands including interfaces with mobile devices or timers controlling usage.

Outdoor operation on soft ground and up and down grades, presents additional, challenging obstacles for both users of a hand propelled wheelchair and for those users unable to provide hand propulsion who depend on powered wheelchairs with electrical controls such as joy-stick controllers.

Most powered wheelchairs and powered scooters are heavy, complicated, expensive machines. They have small, fat tires and fairly complex joy stick-operated control systems. They generally include two electric motors that may be driven by one or more large lead-acid batteries. While intended for outdoor as well as indoor use, the machines are ill-suited for unpaved surfaces like grass and dirt. Nonetheless, powered wheelchairs and scooters have been a boon to the handicapped and elderly.

Scooters generally have a single motor that drives the wheels through a differential. While the costs and weight of a differential are about the same as an extra motor and gear reduction mechanism, the controls on the scooter are less complicated and the unit is generally more reliable than a two-motor wheelchair. Steering of the front wheel of the scooter is accomplished with a small handlebar. The shopping cart is the most popular type powered scooter and, while designed primarily for indoor use, it also sees limited outdoor service in transporting both the user and groceries across the store parking lot. These vehicles' major drawbacks of cost, bulk and weight (generally in the range of 150 to 200 pounds), have prevented their widespread acceptance despite their obvious advantages. In contrast, the disclosed apparatus weights approximately twenty-five pounds. Convention powered chairs or scooters also require special measures in order to transport them. A serious drawback is that the motor drives the wheels through gearing which cannot be overdriven. Thus a drive failure, or a dead battery, can leave the 200 pound vehicle frozen in place with its wheels effectively locked and the user helplessly stranded.

Generally a special type van, or other vehicle providing a large door opening and specialized access equipment, is required to transport powered wheelchairs and powered scooters. The expensive vehicle is usually equipped with a power lift of some sort to enable loading and unloading of such a wheelchair.

The present invention is specifically directed for application to standard wheelchairs. Despite the maneuverability and transportability of these manual wheelchairs, powered wheelchairs are far more capable of handling grades, soft surfaces such as grass and off road conditions. There are other devices for converting manual wheelchairs to power, but none using the single powered wheel of the present invention. The present invention fulfills the need to enable light weight wheelchairs to be less expensively motorized and, if necessary, provide the option for joy-stick, head movement or other similar human interface devices for control without detracting from the appearance, maneuverability and transportability of the wheelchair.

The disclosed invention may be attached and detached from a standard chair. When detached the disclosed apparatus is readily transportable in the trunk of a compact automobile along with the chair. The disclosed apparatus including the electric battery providing motive power may be attached to a standard chair in a few minutes and when attached provides a simple method for elevating the front wheels of the wheelchair and preparing to drive forward, backward and steer. In the preferred embodiment of the disclosed invention, the drive mechanism consists of a wheel driver hub revealed in the U.S. Pat. No. 6,974,399 entitled, "Hub motor mechanism" and issued to Chiu-Hsiang Lo. This patent describes an electrically driven hub comprising an electrical motor and a planetary gear system connected to the motor. A first fixed shaft is connected to the stator of the electrical motor and a second fixed shaft is connected to a second end of the stator of the electrical motor. The first and second fixed shafts are connected to the vehicle frame. A one-way clutch is connected between a cover of the hub and the planetary gear system so that the hub is rotated when the planetary gear system is activated by the motor powered by a battery. In an alternative embodiment, the disclosed invention may utilize a wheel driven by an external motor.

The disclosed invention has the capability to elevate the driven wheel and lowering the front caster wheels of the wheelchair and, thus, the wheelchair may be operated in the manual mode when the apparatus is attached but with the drive wheel in the disengaged position. In this state, the wheelchair may still be easily hand propelled because of the disclosed invention's light weight and lack of bulk. When the wheel driver hub of the disclosed invention is engaged, the propelled wheelchair has excellent maneuverability and a top speed up to 10 miles per hour. Steering is accomplished in the preferred embodiment by turning the propelling wheel driver hub and is controlled by the user using a handlebar, or, alternatively using another means of control such as a joy-stick or other human interface device operating through servo-mechanisms. The turning radius of the wheelchair with the disclosed invention attached is approximately the same as the chair with the apparatus detached. Additional controls for speed and steering may be added for those users who are unable to operate the handlebars and speed controls manually.

OBJECTS OF THE INVENTION

A principal object of the invention is to provide an affordable attachment for a standard wheelchair which provides electrically powered propulsion.

Another object of the invention is to provide a novel propulsion system for powering a standard wheelchair that is easily attached to and detached from the wheelchair.

Another object of the invention is to provide a novel propulsion system that is lightweight, and easily transportable.

A feature of the invention resides in the arrangement for rapidly converting a manual wheelchair into a powered wheelchair.

Another feature of the invention resides in a motorized and steerable wheel driver hub that provides forward or reverse propulsion with steering accomplished with an attached handlebar, or less manual application such as a joy-stick, voice control or other non-manual means.

A still further feature of the invention resides in an adjustable cross bar for enabling the invention to be attached to wheel chairs with a range of dimensions and differing frame structures.

Another feature of the invention resides in the dual capabilities for powering the wheelchair when the steering column of the disclosed device is in the vertical position and the powered wheel contacts the driving surface with the wheelchair's front caster wheels elevated or rotating the steering column to elevate the driven wheel thereby lowering the front caster wheels and enabling manual operation of the wheelchair.

The disclosed invention features two telescoping adjustments of the steering column whereby different sections of the steering column may be secured at different lengths to ergonomically accommodate the user and to fit a particular wheelchair's dimensions.

Another feature of the disclosed invention resides in the capability of the steering column to be locked in a vertical position or driving mode so that the driven wheel contacts the driving surface and the front caster wheels are elevated off the driving surface. Alternatively, the steering column may be rotated with the steering mechanism pushed away from the user and the driven wheel rotated backward and thus elevated while the front caster wheels are lowered to contact the driving surface.

Yet another feature of the disclosed invention is that the top section of the steering column may be unlocked and rotated toward the user.

A further object of the disclosed invention is to provide the capability of modifying the preferred embodiment of the disclosed apparatus to provide the capability for controlling the driven movement by using any of the variety of human interface devices such as a joy-stick, sip and puff system or others.

BRIEF DESCRIPTION OF THE DRAWINGS

These and other objects and features of the invention will be apparent upon reading the following description in conjunction with the drawings in which:

FIG. 6C is a top view of the steerer tube inside the header tube and the combination resting on the wheel fork neck; FIG. 6D is a front view of the combination additionally showing the nuts securing the axle of the wheel driver hub in place at the ends of the wheel fork extensions.

FIG. 9A shows the crossbar at a low position on the header tube and FIG. 9B shows the crossbar elevated toward the top of the header tube.

FIG. 9C shows the steering mechanism extension shaft almost completely lowered into the steering mechanism extension tube and FIG. 9D shows the steering mechanism extension shaft elevated in the steering mechanism extension tube.

SUMMARY OF THE INVENTION

The disclosed invention comprises an attachable/detachable power drive apparatus that may be quickly and easily installed on a manually operable wheelchair to convert it into a motor driven wheelchair. The invention includes a steering mechanism, a steering column, a crossbar that may be attached to the frame of the wheelchair, a battery, a battery charge indicator, a motorized wheel, a control system, and a brake. The length of the steering column may be adjusted in two different ways. The crossbar of the disclosed apparatus is adjustable to adapt to a range of wheelchair dimensions. The steering column of the disclosed apparatus is pivotally connected to the crossbar and may rotate in a vertical plane. Once attached, the invention may be operated in the motor driven mode with the steering column locked in a vertical position so that the powered wheel is in contact with the travel surface and the front caster wheels of the wheelchair are elevated. When the steering column is rotated with the steering mechanism moving forward and downward and the powered wheel rotated backward and upward and thus disengaged from the travel surface, the front caster wheels of the wheelchair contact the travel surface so the wheelchair may be operated in the manual mode. The upper portion of the steering column telescopes to adjust the height of the steering mechanism. The lower portion of the steering column telescopes to adjust the length of the column below the crossbar to achieve the proper length so that the driven wheel contacts the driving surface and the front caster wheels are elevated. Lastly, a portion of the steering column may be unlocked so that the upper portion of the steering column may rotate back toward the user.

The disclosed apparatus is configured with a crossbar with clamps that attach to frame members on either side of the wheelchair as will be more fully described in the following. A steering column comprises steering and control means at the top of the steering column and culminates in a motor driven wheel at the bottom. The steering column is attached perpendicularly to the center of the crossbar with a fitting that permits the steering column to rotate between a position where it is vertical and the motor driven wheel contacts the driving surface and the front caster wheels are elevated and the wheelchair is operated in a powered mode. In a second position, the upper portion of the steering column is pushed forward, the motor driven wheel is rotated backward and upward and the front caster wheels contact the driving surface. In this configuration, the wheelchair may be operated in the manual mode. The disclosed apparatus has another feature wherein an upper portion of the steering column may be folded forward to enable easier access by the user of the wheelchair.

DETAILED DESCRIPTION OF PREFERRED EMBODIMENTS

Figure 1A:
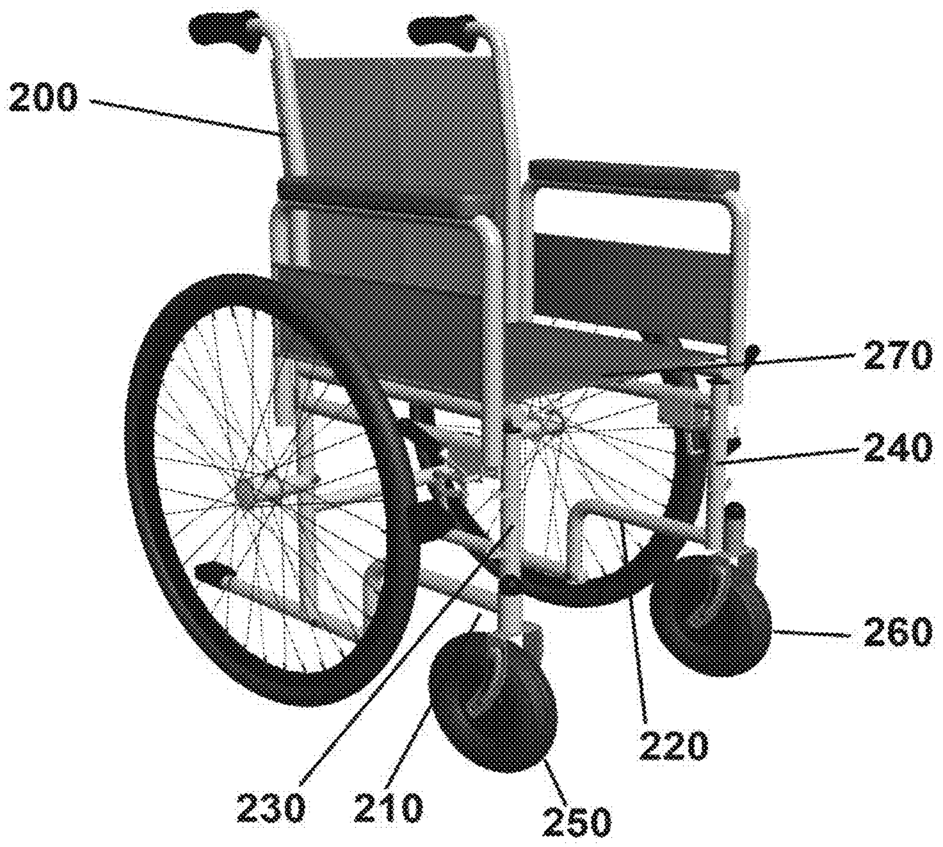
FIG. 1A shows a prior art, manually operated wheelchair with typical lateral horizontal and vertical frame members on each side of the wheelchair, front caster wheels, battery mount and seat.

FIG. 1A shows a prior art, manually operated wheelchair 200 with typical lateral horizontal frame members 210 and 220, vertical lateral frame members 230 and 240, front caster wheels 250 and 260, and seat 270. Some of these wheelchairs are designed for portability, and generally include mechanisms that permit folding to facilitate storage in automobile trunks and the like. It will be appreciated that such wheelchairs are well known in the art and form no part of the present invention.

Figure 1B:
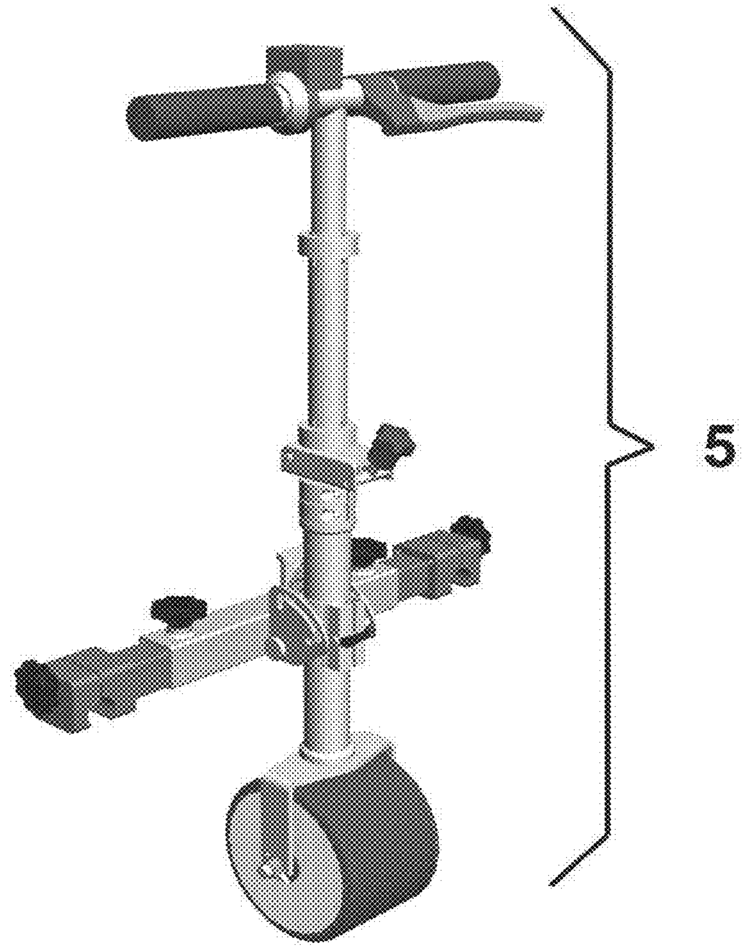
FIG. 1B shows a perspective view of the disclosed apparatus with a wheel driver hub.

FIG. 1B shows a perspective view of the disclosed apparatus 5. The features and capabilities of the disclosed apparatus will be revealed in the following discussion.

Figure 1C:
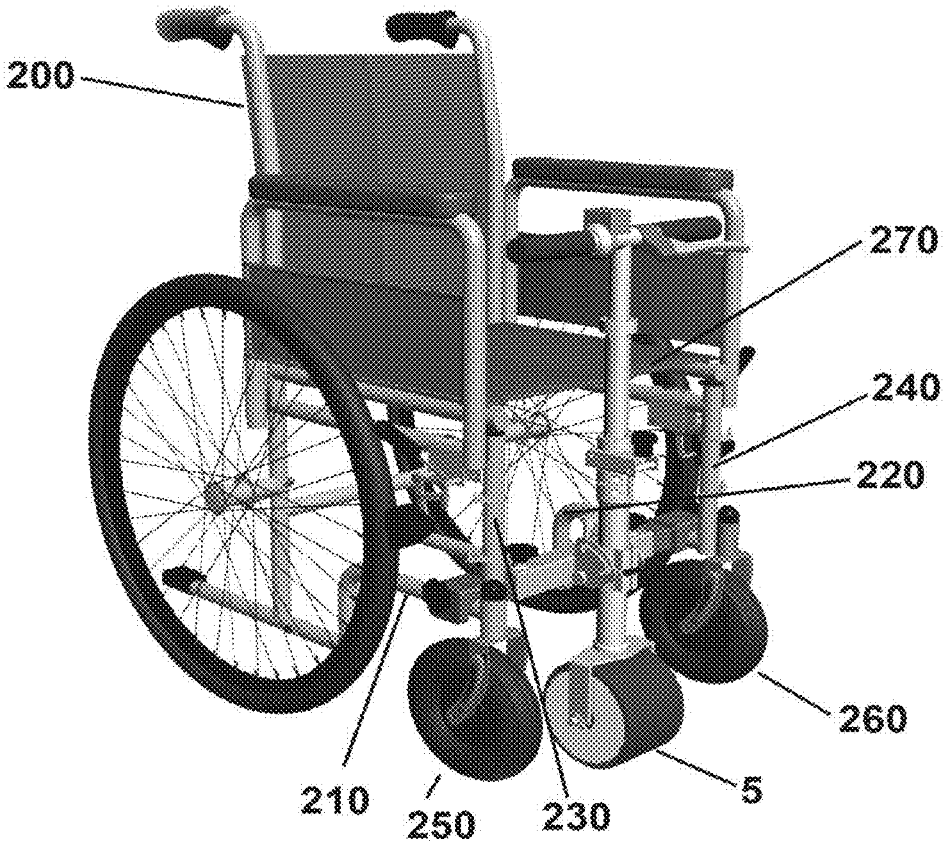
FIG. 1C shows a perspective view of the disclosed apparatus mounted on a wheelchair.

FIG. 1C shows a perspective view of the disclosed apparatus 5 mounted on the first 210 and second 220 lateral vertical frame members of the wheelchair 200. Other features identified in FIG. 1C are the wheelchair's 200 first lateral horizontal frame member 230 and second lateral horizontal frame member 240. Other wheelchair 200 features pictured are the first front caster wheel 250, the second front caster wheel 260 and the seat 270.

Figures 2A, 2B:
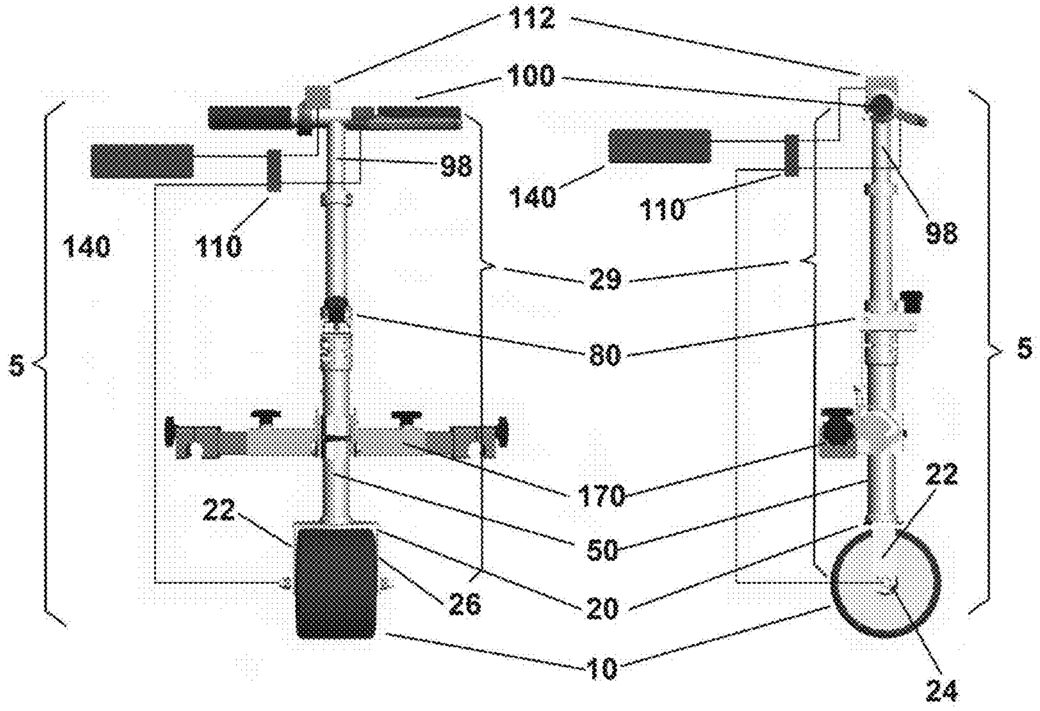
FIG. 2A shows a front view of the disclosed apparatus with a wheel driver hub.
FIG. 2B shows a side view of the disclosed apparatus with a wheel driver hub.

FIG. 2A is a front view of the disclosed apparatus 5 including the crossbar 170 which enables attachment to frame members of the wheelchair, the battery 140 which may be placed in several different compartments attached to the wheelchair which are not shown and the controller 110 which is shown not yet placed on the apparatus. It will be clear to one skilled in the art that, given the flexibility afforded by the electrical leads, the battery and the controller may be placed in several places on the wheelchair or the apparatus. The battery is electrically connected through the controller 110 to the powered wheel 10, which in the preferred embodiment is a wheel driver hub with an internal motor. In this figure and subsequent discussion, the steering column 29 comprises the elements of the apparatus beginning with the handlebar extension 98 (or other steering mechanism in an alternative embodiment as will be shown in a later figure) which descends from the steering mechanism assembly 100 which, in the preferred embodiment is a handlebar construct, and which joins with additional components and shall be further discussed in the following. The steering column continues and extends to the ends of the first wheel fork branch 22 and the second wheel fork branch 26.

FIG. 2B is a line drawing depicting a side view of the disclosed apparatus 5 shown in FIG. 2A further indicating the U-shape slot 24 in the first wheel branch fork 22. The first end of the axle 12 of the powered wheel directed through the center of the wheel driver hub 10 is placed into the U-shaped slot 24 and held in place by the first nut 14, shown in more detail in FIGS. 6A, B, C, D, and E threading onto the end of the first end of the axle 12. In an alternative embodiment, the wheel driver hub is replaced by a wheel driven by an external motor. In this instance, those skilled in the art will know that the axle 12 geometry and securing first and second nuts 14 and 16 will remain the same. The second end of the axle 12 and its securing nut 16 are not shown in FIG. 2B but are similarly shown in more detail in FIG. 6B. C, D, and E. Other elements of the disclosed apparatus 5 are the crossbar 170, the header tube clamp assembly 60 and the upper tilt assembly 80. These latter elements will be more fully described in subsequent figures and discussion.

Figures 2C, 2D:
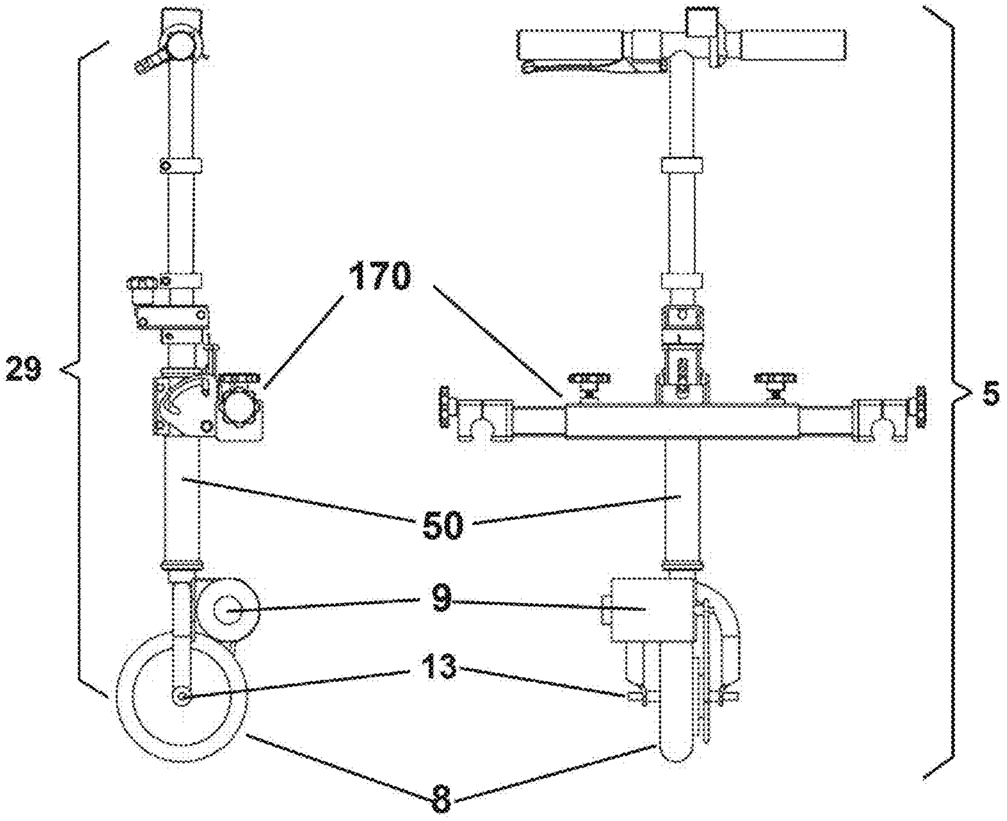
FIG. 2C shows a side view of the disclosed apparatus with an externally powered wheel.
FIG. 2D is a back view of the disclosed apparatus with an externally powered wheel.

FIGS. 2C and 2D show a side view and a back view of an alternative embodiment of the disclosed apparatus 5 where the wheel driver hub 10 is replaced by a wheel 8 driven by an external motor 9 attached to the lower portion of the steering column 29.

Figures 3A, 3B, 3C, 3D:
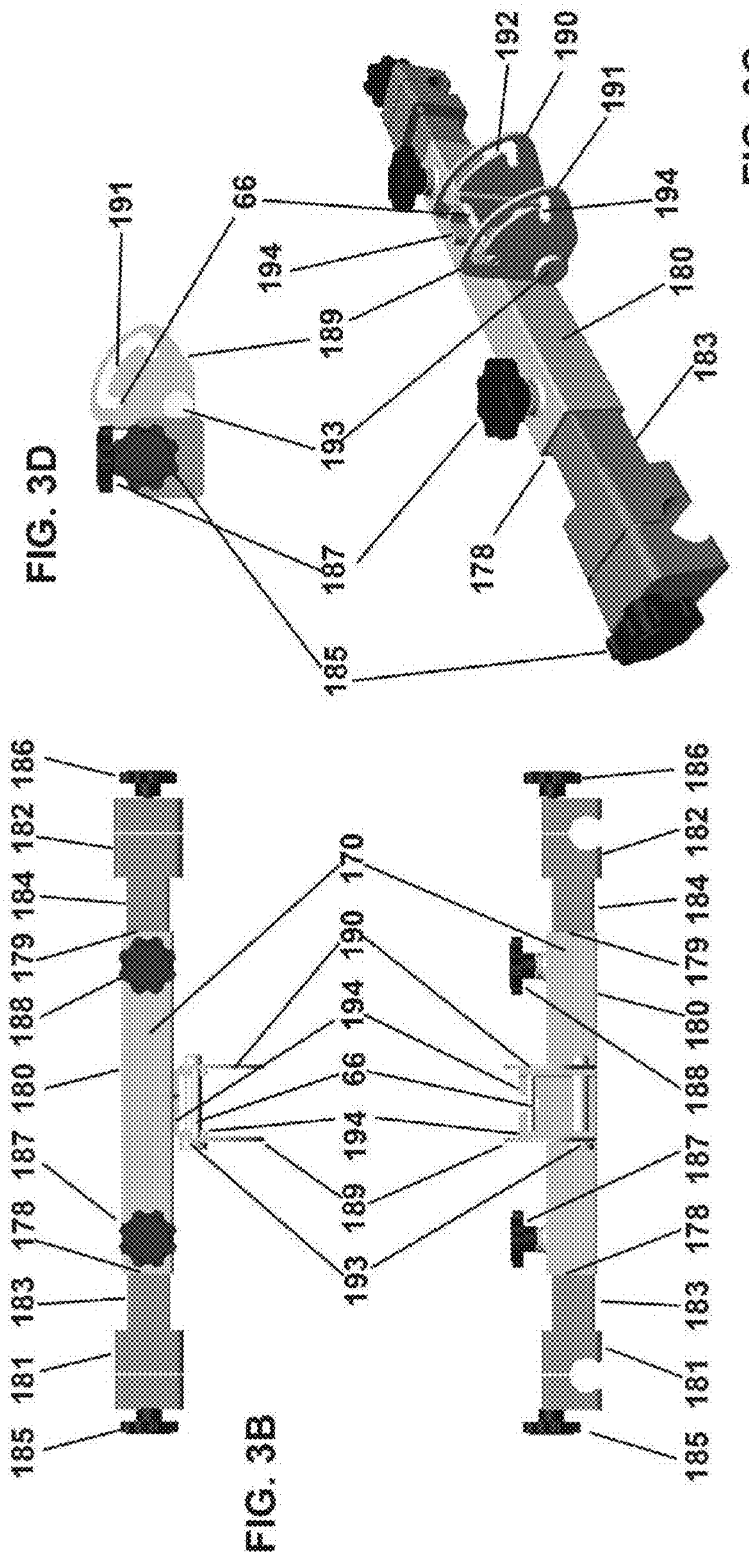
FIG. 3A is a front view of the crossbar of the disclosed apparatus showing more detail of the first and second Tracking Plates affixed to the Central portion of the Cross Bar.
FIG. 3B is a top view of the crossbar.
FIG. 3C is a perspective view of a portion of the middle portion of the crossbar showing the first and second tracking plates, the pivot pin and the back tracking plate.
FIG. 3D is a side view of the crossbar seen from the end presenting the first end clamp tightening screw.

FIG. 3A is a front view of the crossbar assembly 170 comprising the end clamps 181 and 182 which can be affixed either to horizontal or vertical frame members of the wheelchair, the tightening means 185 and 186 comprising knurled knobs with threaded extensions penetrating through the end clamps 181 and 182 whereby the tightening means can close the end clamps 181 and 182 on the chosen wheelchair frame members, the central portion of the cross bar 180 into which fit extendably the first insertable inner tube 183 fitting into the first end 178 of the central portion of the cross bar 180 and the second insertable inner tube 184 fitting into the second end 179 of the central portion of the cross bar 180, the first and second tightening means 187, and 188 with similar construction as tightening means 181 and 182 and which when tightened against the inserts 178 and 179 stabilize the length of the crossbar extending between the chosen frame members on either side of the wheelchair, and the first and second tracking plates 189 and 190 affixed to the Central portion 180 of the Cross Bar 170, the pivot pin 193, the tilt tracking pin 66, the back tracking plate 194 which is affixed between the tracking plates 189 and 190 will be additionally shown in subsequent figures. The tracking plates 189 and 190, the pivot pin 193, the tilt tracking pin 66 and the back tracking plate 194 form elements of the header tube clamp assembly 60 and will be shown in more detail in subsequent figures.

FIG. 3B is a top view of the crossbar 170 showing the end clamps 181 and 182 which can be affixed either to horizontal or vertical frame members of the wheelchair, the tightening screws 185 and 186 which close the end clamps 181 and 182 on the chosen wheelchair frame members, the central portion of the cross bar 180 into which fit extendably the first insertable inner tube 183 fitting into the first end 178 of the central portion of the cross bar 180 and the second insertable inner tube 184 fitting into the second end 179 of the central portion of the cross bar 180, the first and second tightening screws 187, and 188 which when tightened against the inserts 178 and 179 stabilize the length of the crossbar extending between the chosen frame members on either side of the wheelchair, and the first and second tracking plates 189 and 190 affixed to the Central portion 180 of the Cross Bar 170, the pivot pin 193, the tilt tracking pin 66 the back tracking plate which is affixed between the tracking plates 189 and 190 will be shown in subsequent figures. The tracking plates 189 and 190, the pivot pin 193, the tilt tracking pin 66 and the back tracking plate form elements of the header tube clamp 60 shown in more detail in subsequent figures.

FIG. 3C is a perspective view of the first and second tracking plates 189 and 190 affixed to the central portion of the crossbar 180, the back tracking plate 194 affixed between the tracking plates 189 and 190, the pivot pin 193 extending between the tracking plates 189 and 190, the tilt tracking pin 66 extending between the first and second tracking grooves 191 and 192.

FIG. 3D is a side view from one end of the crossbar 170 depicting the first end clamp tightening means 185, the first tightening means 187, the first tracking plate 189 affixed to the central portion of the crossbar 180, the first tracking groove 191 and the pivot pin 193.

Figures 4A, 4B, 4C:
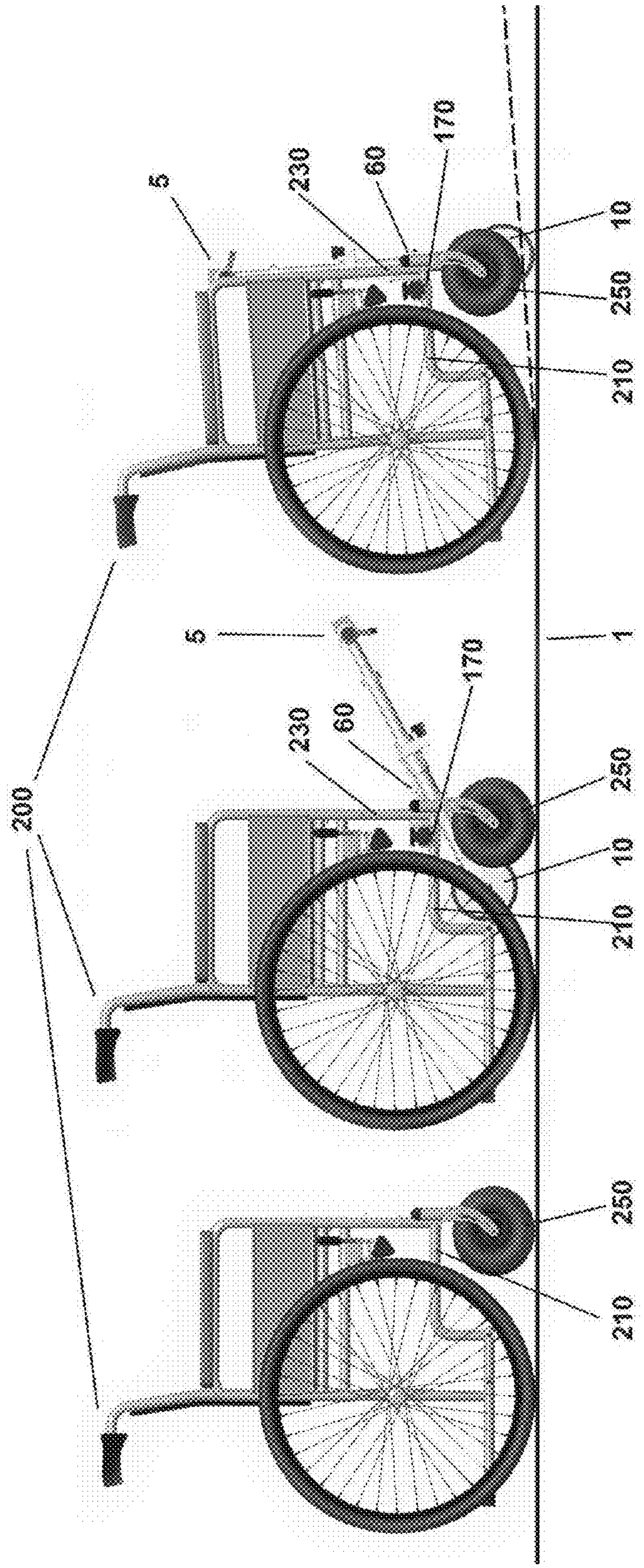
FIG. 4A shows a side view of the wheelchair.
FIG. 4B is a side view of the wheelchair with the disclosed apparatus attached and the steering column of the apparatus rotated forward, the front caster wheels and in contact with the travel surface and the wheel driver hub elevated.
FIG. 4C is a side view of the wheelchair with the disclosed apparatus attached to the wheelchair and with the whole steering column of the apparatus in the vertical position, the front caster wheels of the wheelchair elevated and the wheel driver hub in contact with the travel surface.

FIG. 4A is a side view of the wheelchair 200 with the disclosed apparatus removed. The first lateral horizontal frame member 210 and the first front caster wheel 250 are indicated. All four wheels of the wheelchair are on the driving surface 1.

FIG. 4B is a side view of the wheelchair 200 with the disclosed apparatus 5 attached where the end clamps 185 and 186 of the crossbar 170 are attached to the horizontal frame members 210 and 220 (not shown) and the upper end of the apparatus 5 is rotated forward about the pivot pin in the header tube clamp assembly 60. In this position, the wheel driver hub 10 of the preferred embodiment of the disclosed apparatus 5 is elevated and no longer in contact with the driving surface 1. With the wheel driver hub 10 so elevated, the front caster wheels 250 and 260 (not shown) of the wheelchair 200 contact the driving surface 1 and the wheelchair may be operated in manual mode and propelled by the operator.

FIG. 4C is a side view of the wheelchair 200 with the disclosed apparatus 5 attached where the end clamps 185 and 186 of the crossbar 170 are attached to the horizontal frame members 210 and 220 (not shown) and the upper end of the apparatus 5 is rotated back toward the wheelchair seat and the operator. In this mode, the wheel driver hub 10 contacts the driving surface 1 and the front caster wheels 250 and 260 are elevated above the driving surface 1. This is accomplished by adjusting the length of the steering column 29 which will, with the other elements enabling this maneuver, be discussed and shown in subsequent figures. In this configuration, the wheelchair and attached apparatus may be operated in the powered mode.

Figure 5A:
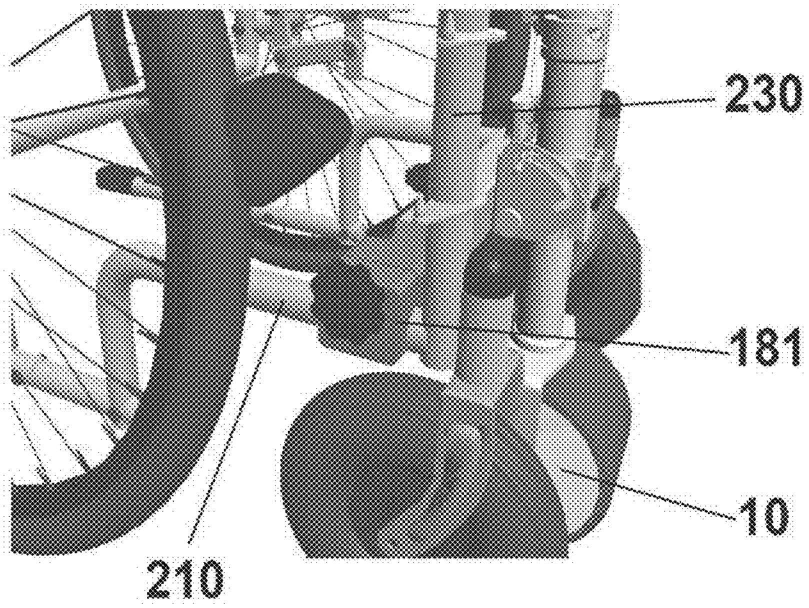
FIG. 5A shows an expanded perspective view of the wheelchair with the first end clamp of the crossbar clamped on a lateral, horizontal frame member of the wheelchair.

FIG. 5A is an expanded perspective view of a portion of the wheelchair 200 indicating the first horizontal frame member 210 with the end clamp 181 of the crossbar 170 affixed thereto. The first vertical frame member 230 is also shown.

Figure 5B:
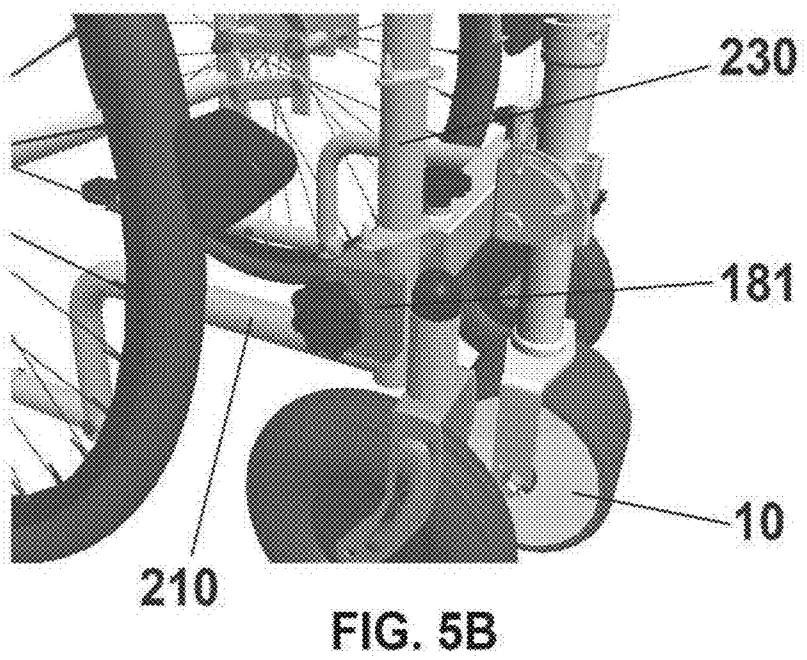
FIG. 5B shows a perspective view of the wheelchair with the first end clamp of the crossbar clamped on a lateral, vertical frame member of the wheelchair.

FIG. 5B is and expanded perspective view of a portion of the wheelchair 200 indicating the first vertical frame member 230 with the end clamp 181 of the crossbar 170 affixed thereto.

Figure 6A:
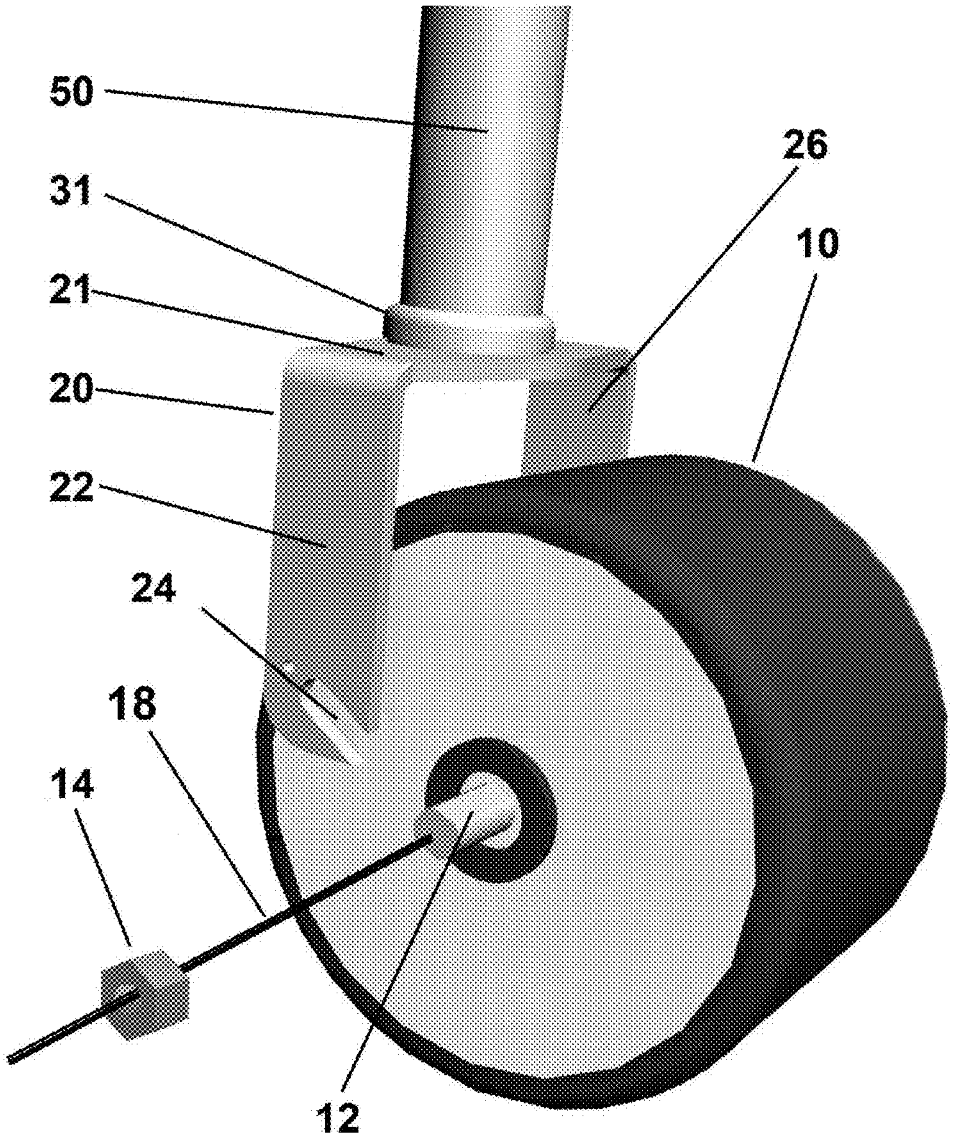
FIG. 6A is a perspective view of the wheel driver hub, the wheel fork-steerer tube construct showing the header tube coaxially placed over the steerer tube and the bearing assembly at the lower end of the header tube, the U-shape slots at the ends of the wheel fork extensions to accept the axle of the wheel driver hub, and the bolts holding the wheel driver hub onto the branches of the wheel fork.

FIG. 6A is a perspective view of the lower elements of the disclosed apparatus comprising the header tube 50 with the bottom bearing assembly 31 inserted into the bottom end of the header tube 50 descending to contact the wheel fork neck 21 of the wheel fork 20 and further comprising the wheel the first and second wheel fork branches 22 and 26, the wheel driver hub 10 transected medially by the axle 12, The first end of axle 12 is threadably connectable to the nut 14 The second end of the axle 12 similarly passes through the second U-shape notch 28 (not shown) located in the end of the second wheel fork branch 24 and is threadably connected to the second nut 16 (not shown). When the nuts 14 and 16 are threaded onto the first and second ends of the axle 12, the wheel driver hub 10 is firmly affixed between the wheel fork branches 22 and 26. The wheel driver electrical lead 18 extending from the first end of the axle 12, passing through the first U-shape notch 24 in the end of the first wheel fork branch 22, passing through the nut 14 and ending in the wheel driver electrical lead connector 19 will be illustrated in subsequent figures.

Figure 6B:
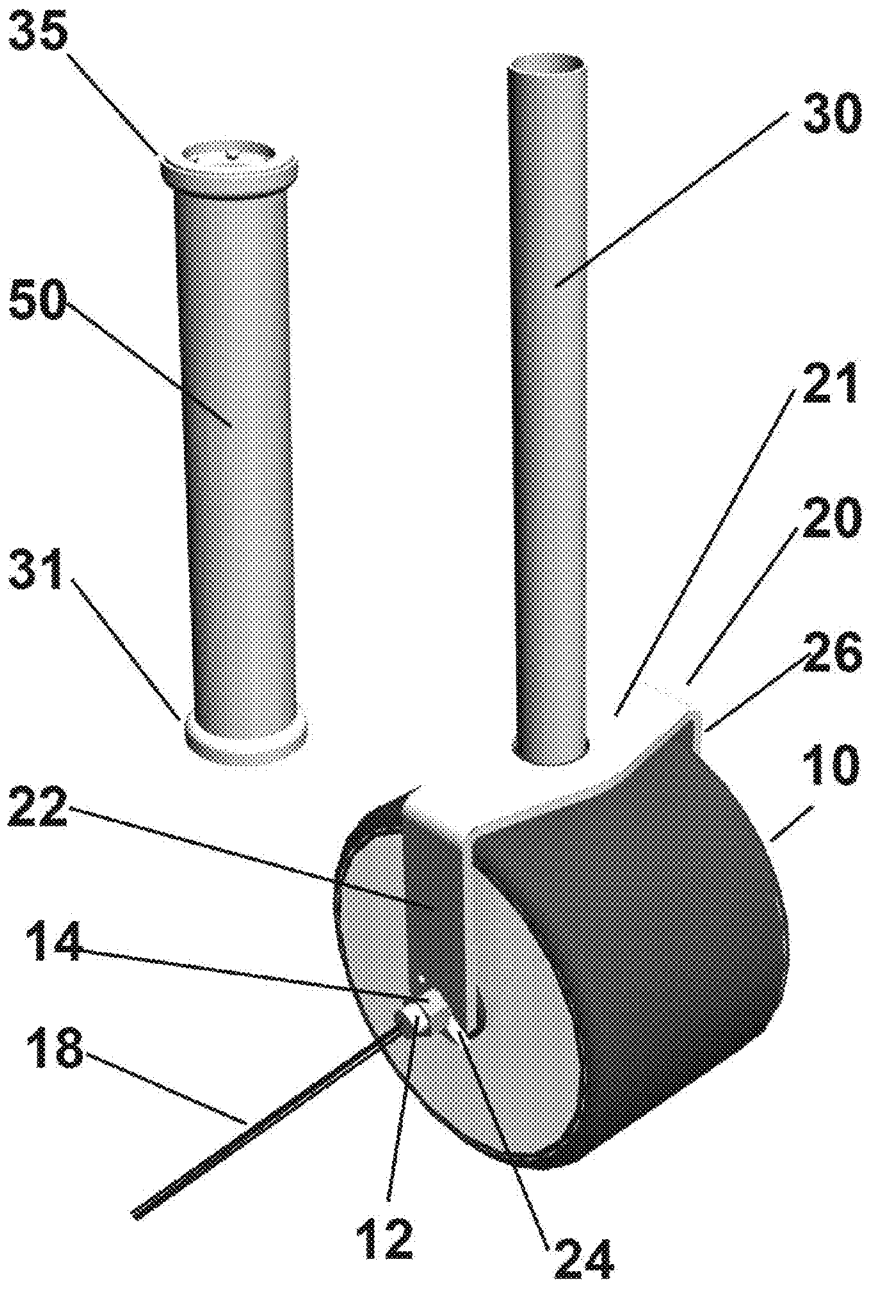
FIG. 6B is a perspective view of the wheel driver hub fitting between and secured to the wheel forks, the steering neck, the steerer tube and the header tube with bearing assemblies inserted into the ends of the header tube.

FIG. 6B is a perspective view of the components presented in FIG. 6A showing more explicitly the wheel fork neck 21, the first wheel fork branch 22, the first U-shape notch 24, the nut 14 binding the first end of the axle 12 of the wheel driver hub 10 or other powered wheel, the electrical lead 18 emanating from the first end of the axle 12, the steerer tube 30 extending upward from the steerer neck 21 of the wheel fork 20. FIG. 6B also shows the header tube 50 with the bearing assembly 31 inserted into the lower end of header tube 50 and the bearing assembly 35 inserted into the upper end of header tube 50. The header tube 50 will be shown to be fit coaxially over the steerer tube 30.

Figures 6D, 6E, 6F:
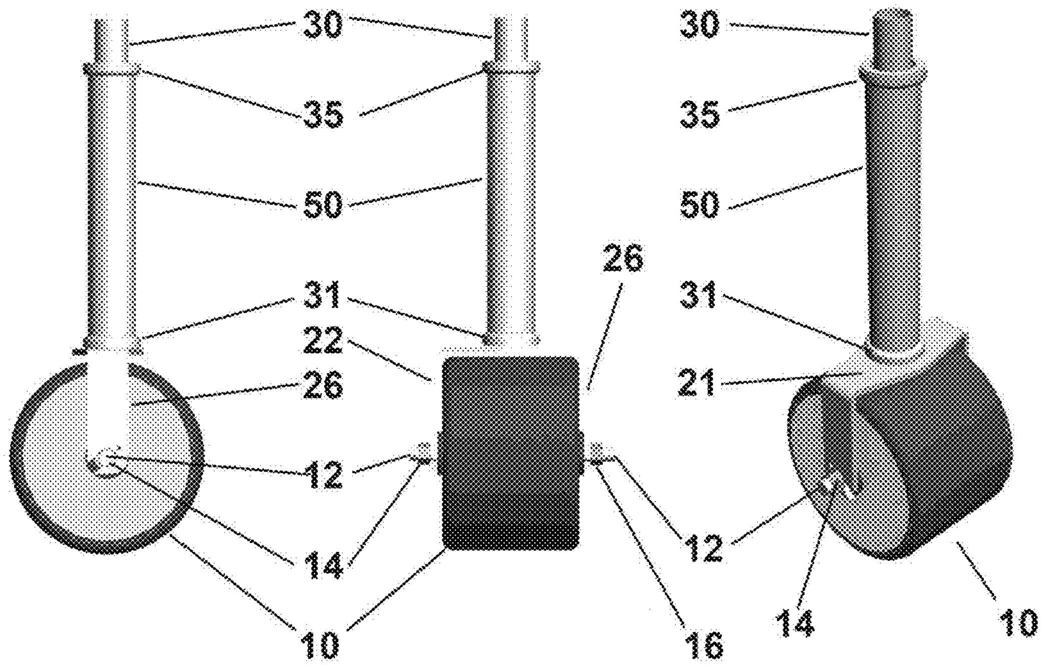
FIG. 6D is a perspective view of this combination.
FIG. 6F is a side view of the combination.
Figure 6C:
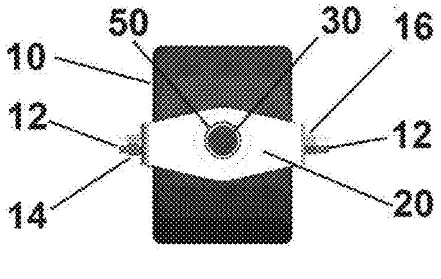
FIGS. 6C, D, E and F provide more views of the combined steerer tube-wheel driver hub assembly where

FIG. 6C is a top view of the steerer neck over the wheel driver hub 10 or other powered wheel, and the securing nuts 14 and 16 threaded onto the first and second ends of axle 12. The steerer tube 30 residing inside the header tube 50 can be seen on end.

FIG. 6D is a perspective view of the lower section of the steering column showing the wheel driver hub 10 mounted between the branches 22 and 26 of the wheel fork 20, the steerer tube 30 extending upward through the header tube 50 resting on the wheel fork neck 21. At each end of the header tube there is a first and second bearing assembly 31 and 35.

FIG. 6E is a front view of the same features shown in FIG. 6D.

FIG. 6F is a side view of the same features shown in FIG. 6D.

Figure 6G:
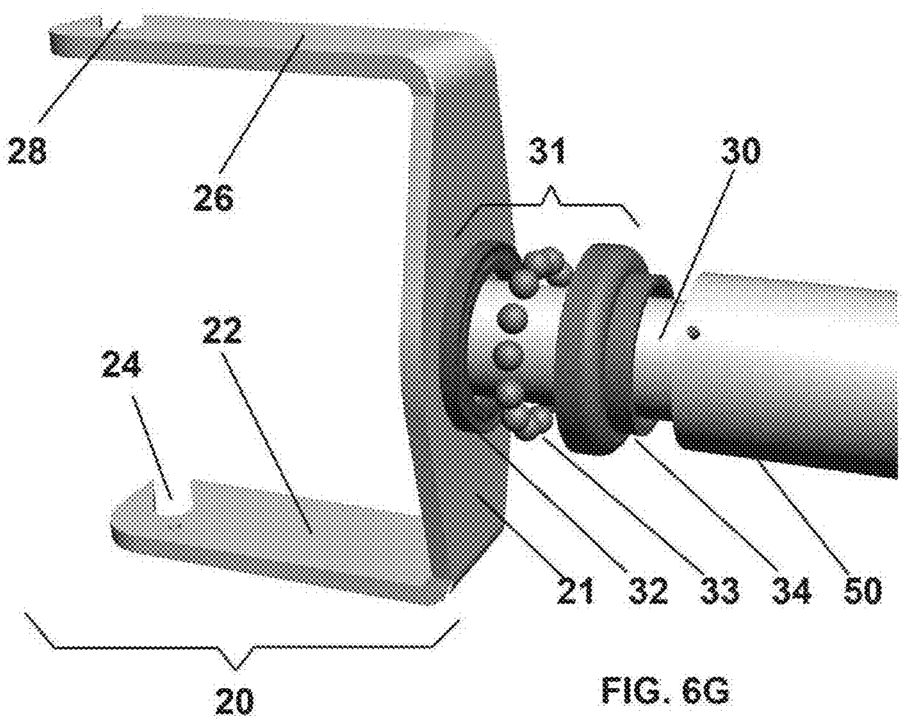
FIG. 6G is an exploded perspective view of the header tube descending on the steerer tube and meeting the elements of the lower bearing assembly contacting the wheel fork neck.
Figure 6H:
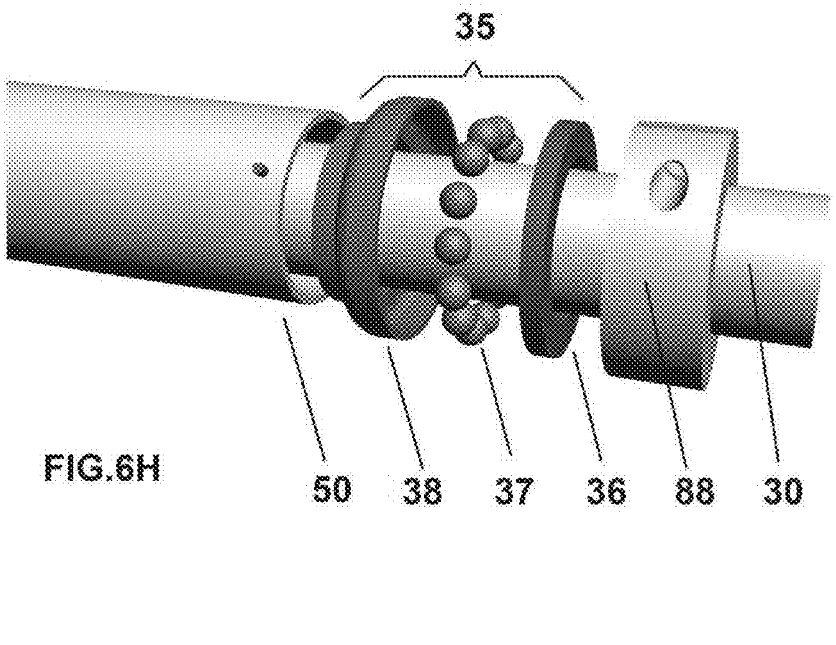
FIG. 6H is an exploded perspective view of the upper end of the header tube ascending to the upper bearing assembly and contacting the clamp to secure the position of the header tube on the steerer tube.

FIGS. 6G and 6H show perspective views of the bearing assemblies 31 and 35 with bearing assembly 31 comprising a bearing race 32, a plurality of ball bearings 33 contacting and moving on the bearing race 32 and a flanged bearing cup 34 with its flanged end fitting inside the lower end of header tube 50 and its wider end fitting over the bearing race 32 thus enclosing the ball bearings 33 in a circular track. The second and upper end of header tube 50 shown in FIG. 6H receives the second bearing assembly 35 shown in FIG. 6H and is identical to the first bearing assembly 31 and comprises bearing race 36, bearings 37 and bearing cup 38 with the flanged end of cup 38 fitting into the second (top) end of header tube 50. The ball bearings 33 shown in FIGS. 6G and 37 shown in FIG. 6H contact the steerer tube 30 and provide a low friction feature so that the steerer tube 30 may rotate freely inside the header tube. Clamp 88 shown in FIG. 6H secures the position of the header tube 50 on the steerer tube 30. The ball bearings 37 in the upper bearing assembly 35 serve not only to provide a low friction feature to facilitate rotation of the steerer tube but also facilitate rotation of the cylindrical clamp 88 adjoining the bearing race 36 so that the bearing 36 may rotate freely. In the same way, ball bearings 33 facilitate rotation of the steerer tube inside header tube.

Figure 7A:
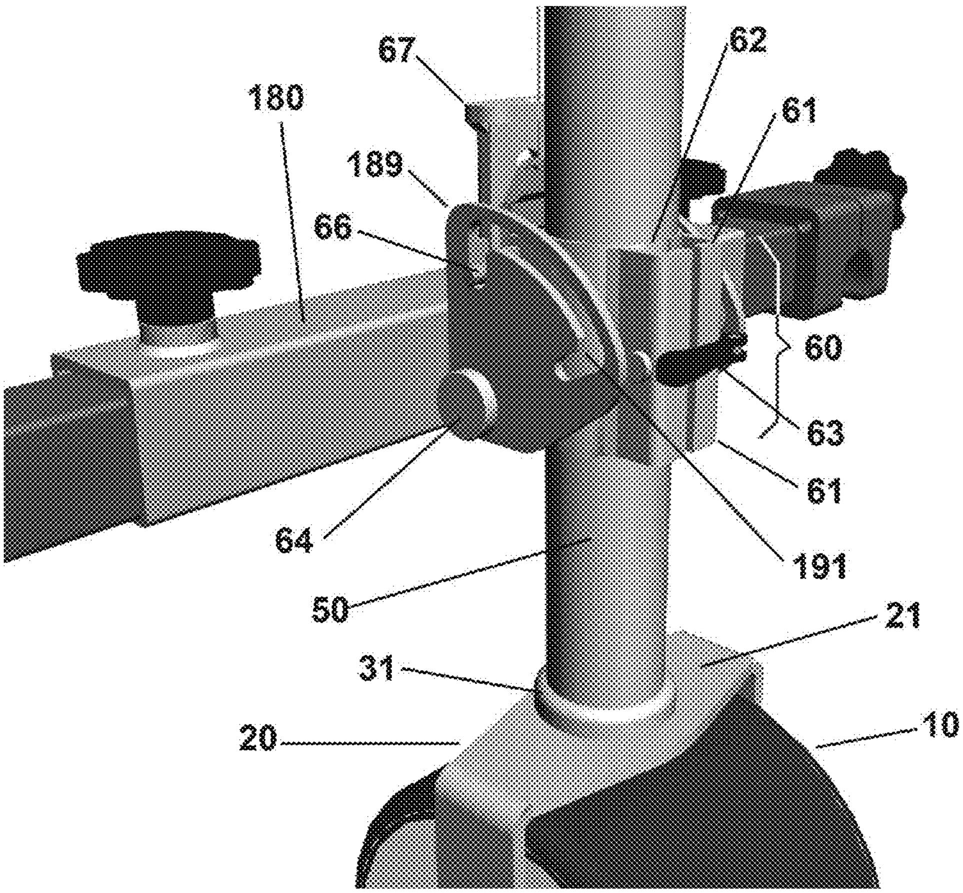
FIG. 7A is a perspective view of the header tube clamp assembly 60 inserted between the tracking plates with the clamp assembly affixed to the header tube and providing the pivotal connection enabling the rotation of the steering column.

FIG. 7A is a perspective view of the header tube clamp assembly 60 inserted between the first and second tracking plates 189 and 190 (not shown) affixed to the center of the center piece of the crossbar 180. This assembly 60 is slid over and affixed to the header tube 50 before the upper bearing assembly 35 (not shown in this figure is inserted into the top end of the header tube 50. The header tube clamp assembly 60 is secured in place on the header tube 50 using the cut cylinder clamping structure 62 which is closed using the action of clamp handle 63 thereby securing the header tube clamp assembly 60 at a selected position on the header tube 50. Once the clamp assembly 60 is secured in place, the upper bearing assembly 35 is inserted into the top of the header tube. 50. The header tube clamp assembly 60 provides the pivotal connection shown in FIGS. 4B and 4C in combination with the tracking plates 189 and 190 extending from the central section of the crossbar 180. The remainder of parts comprising the header tube clamp assembly 60 comprise the first tracking groove 191 located diagonally in the first tracking plate 189 and the second tracking groove parallel to the first tracking groove and located in the second tracking plate 190 (not shown), the pivot pin 64 which extends between the first and second tracking plates 189 and 190 around which the header tube clamp assembly 60 rotates when the tracking tilt pin 66 which extends between the tracking plates 189 and 190 is moved through the tracking grooves 191 and 192. FIG. 7A also shows the bottom bearing assembly 31 resting on the wheel fork neck 21. The order of assembly of these elements is that the bottom bearing assembly 31 is fitted into the bottom of the header tube 50, the header tube 50 is placed over the steerer tube 30, the header tube clamp assembly 60 is placed over the header tube 50 and affixed in place and the upper bearing assembly 35 is then fitted into the top of the header tube 50.

Figure 7B:
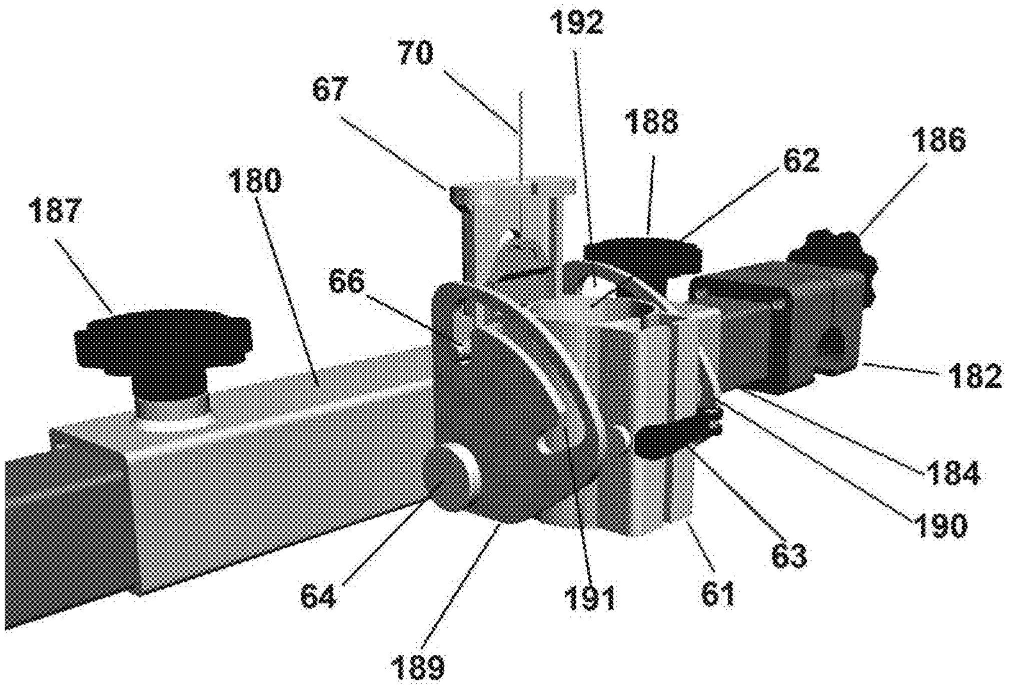
FIG. 7B is a front perspective view of a section of the crossbar showing the elements of the header tube clamp assembly.

FIG. 7B is a front perspective view of the center section 180 of the crossbar 170 showing additional elements of the header tube clamp assembly 60. In FIG. 7B, the rear release platform 67 forms a portion of clamp assembly 60. The rear release platform 67 extends orthogonally and upwards from the cylindrical portion 62 of the clamp assembly 60 and the central section of the crossbar section 180. The rear release platform contacts the back tracking plate 194 (shown in FIG. 7C) which is affixed and contacts the center portion of the crossbar 180 and is located between the first and second tracking plates 189 and 190. The release cable 70 extends downward through a groove in the rear release platform 67 and contacts and is affixed to the J-hook 72 which contacts the tilt tracking pin 66 which contacts the curved portion of the J-hook 72. Vertical motion of the J-hook 72 lifts the tilt tracking pin 66 and enables the tilt tracking pin 66 to move along the tracking grooves 191 and 192 which further enables the rotation of the steering column 29 to assume the positions displayed in FIGS. 4B and 4C. The tilt tracking pin 66 extends between both the tracking plates 189 and 190 and the tracking grooves 191 and 192. The tracking grooves 191 and 192 are configured as arcs with deflected grooves at each end. The tilt tracking pin 66 resides in the deflections closest to the cross bar 170 when the steering column 29 is in the upright position with the wheel 10 in contact with the driving surface 1.

Figures 7C, 7D:
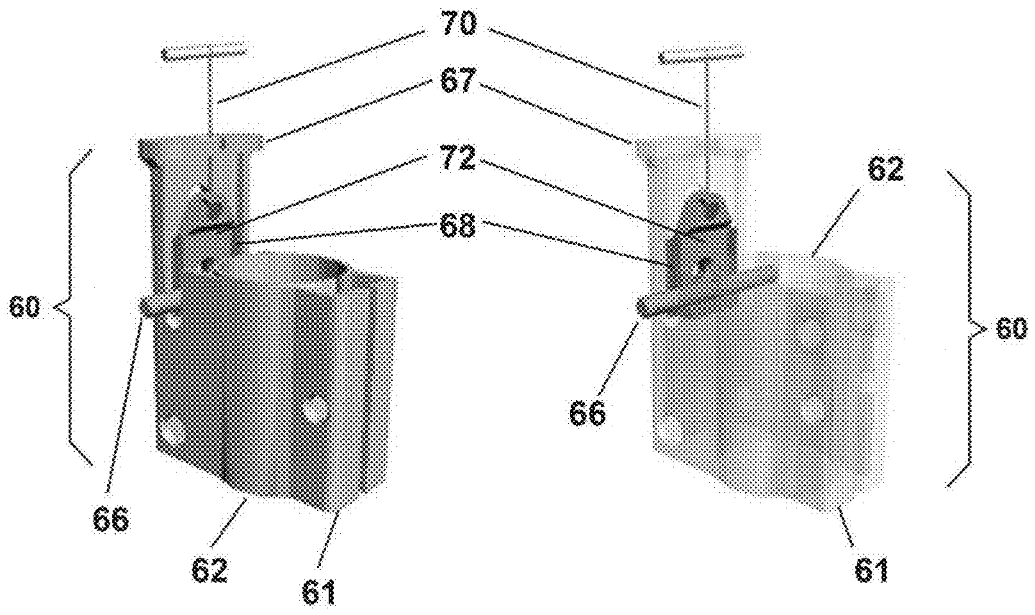
FIG. 7C is a rear perspective view of a section of the crossbar showing the back side of the header tube clamp assembly.
FIG. 7D is an exploded view of elements of the header tube clamp assembly.

FIG. 7C is a perspective view of elements of the clamp assembly 60 showing the cut cylinder assembly 62 which when tightened around the header tube 50 secures the cut cylinder assembly 62 at the selected position, the tracking pin 66 able to traverse the tracking grooves 191 and 192, the release cable 70, the rear release platform 67, the J-hook 72, the release cable and handle 70 and the release guide 68 in which the J-hook slides.

FIG. 7D is a more transparent perspective view of the elements of the clamp assembly 60 showing the same elements as FIG. 7C but showing more of the J-hook 72 contacting the tracking pin 66 and the tracking pin 66 extending across the assembly.

Figure 7E:
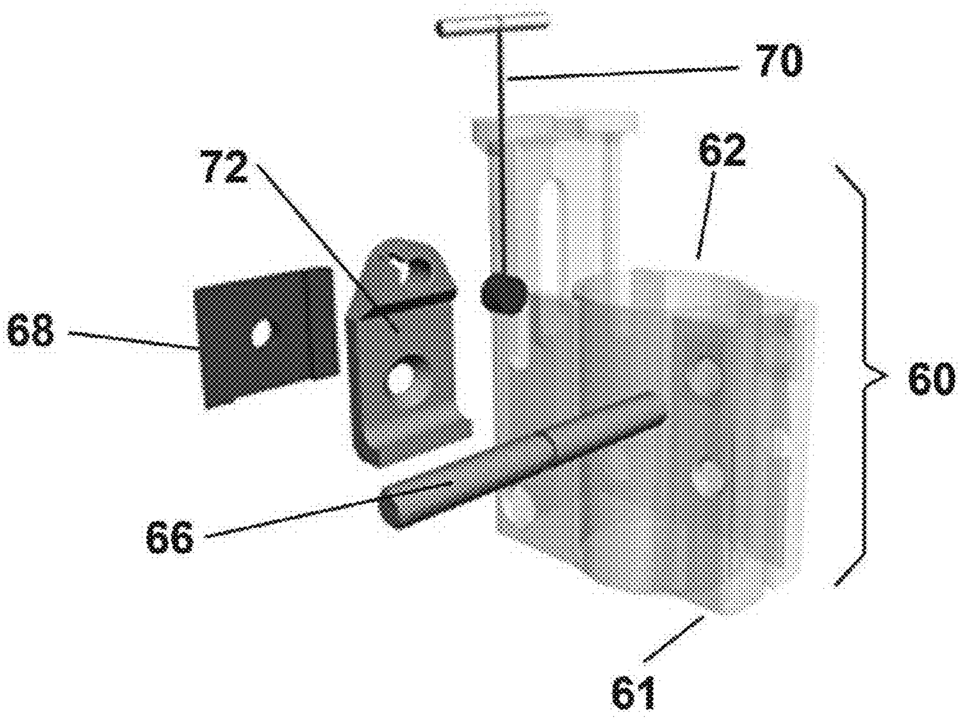
FIG. 7E is a perspective view of the elements of the header tube clamp assembly used to move the a tracking pin so that it traverses the tracking grooves in the tracking plates.

FIG. 7E is an exploded and more transparent view of parts comprising the clamp assembly showing the parts displayed in FIGS. 7C and 7D.

Figure 7F:
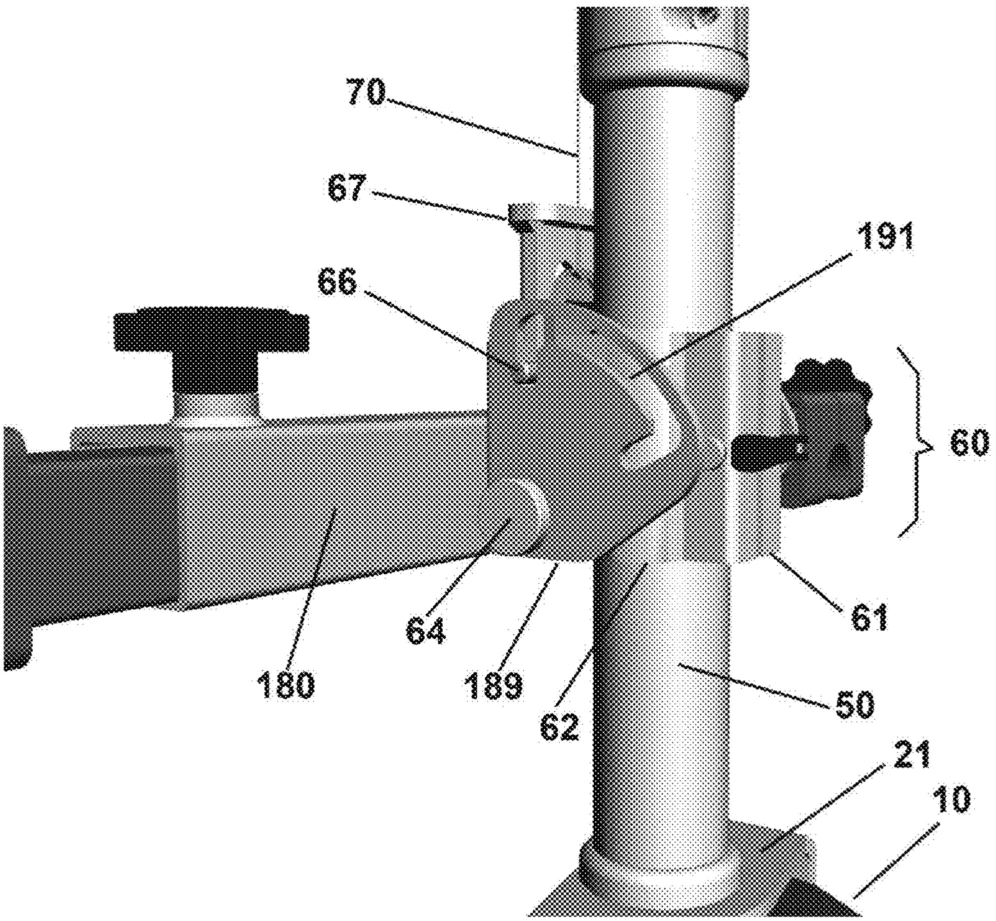
FIG. 7F is a perspective view of the middle section of the cross bar with the header tube clamp assembly pivotally connected to the middle section of the crossbar and the header tube directed through the cylindrical element of the header tube clamp assembly and showing the tracking pin positioned between the tracking plates to maintain the steering column in the vertical position.
Figure 7G:
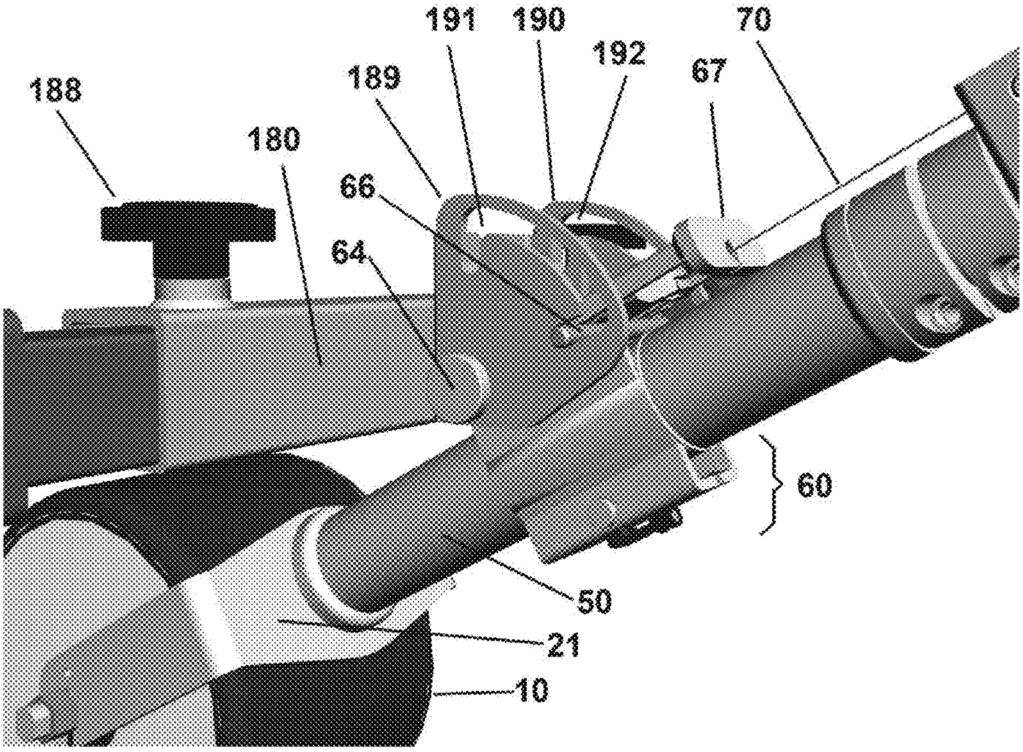
FIG. 7G is a perspective view of the assembly of FIG. 7F but with the steering column rotated and showing the tracking pin moved to facilitate the rotation.
Figure 7H:
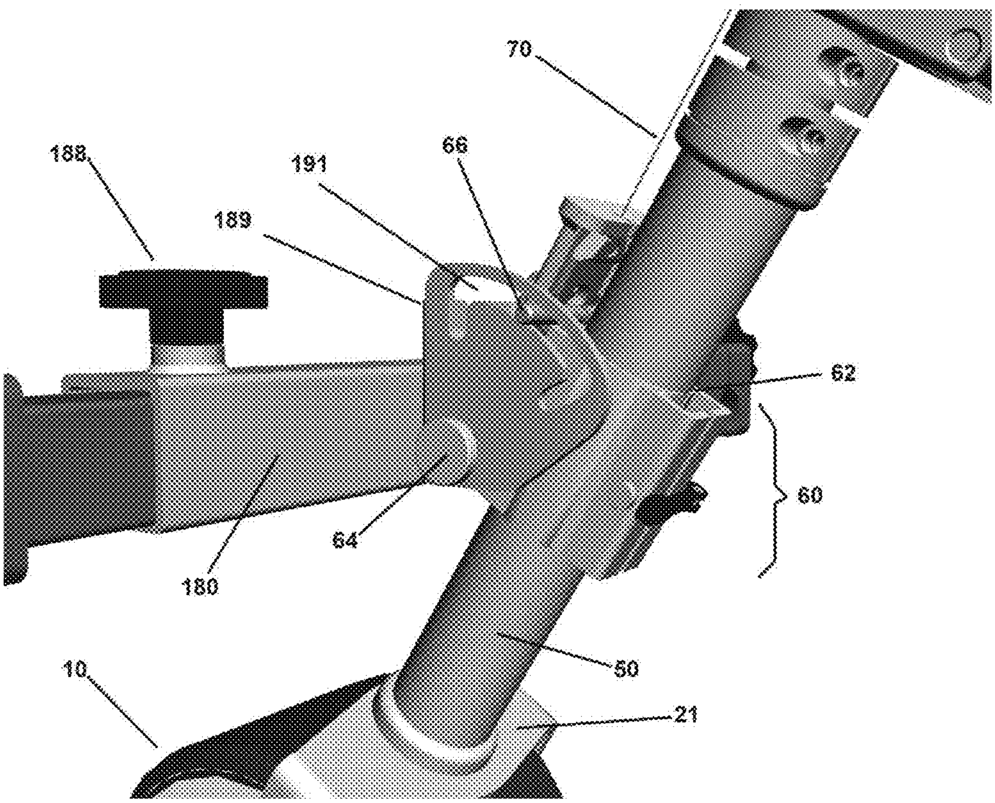
FIG. 7H is a perspective view of the header tube clamp assembly 60 shown in FIGS. 7F and 7G showing the tracking pin in transition from one locking position to another in the process of rotating the steering column.

FIGS. 7F, 7G and 7H illustrate the movement of the tilt pin 66 moving between the two positions where the steering column 29 is in the vertical position as in FIG. 7F and the inclined position shown in FIG. 7G. When the tilt tracking pin 66 is lifted by the release cable 70 and the top of the steering column 29 is pushed forward, the tilt tracking pin 66 slides along the tracking grooves 191 and 192 until the tilt tracking pin 66 comes to rest at the ends of the deflections furthest from the cross bar 170. In this state, the steering column is rotated so that the wheel 10 is elevated and the front caster wheels 250 and 260 contact the driving surface 1. The steering column 29 may be returned to the vertical position by reversing the process, namely, releasing the tilt tracking pin and pulling the top of the steering column toward the occupant of the wheelchair. The deflections in the tracking grooves 191 and 192 insure that the steering column is locked and remains in the selected position.

FIG. 7H illustrates the tilt pin 66 in mid traverse in the tracking grooves 191 and 192.

Figure 7I:
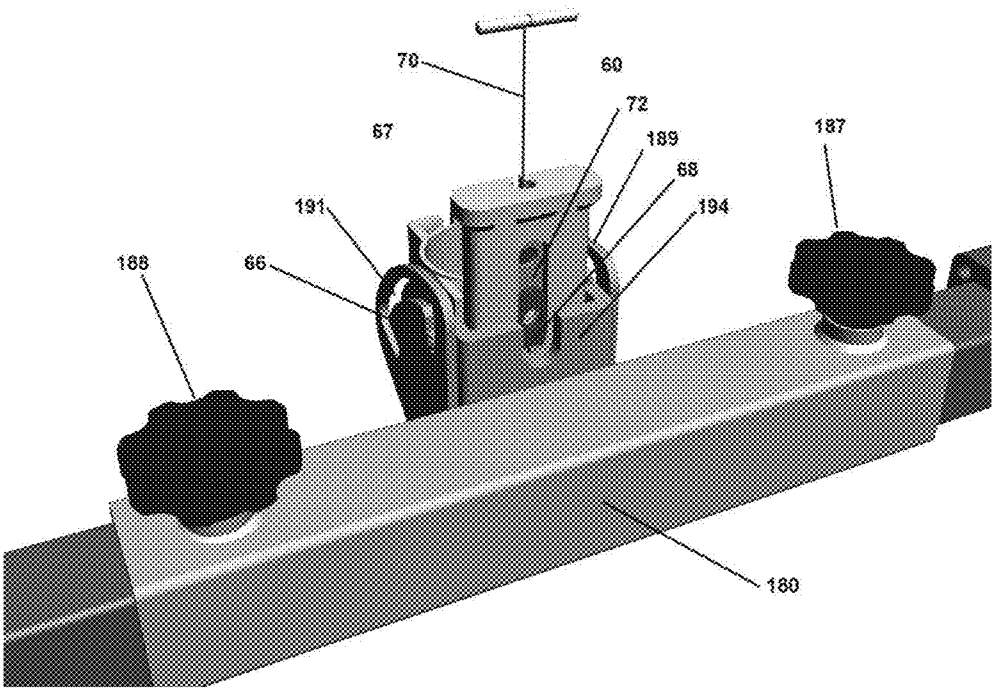
FIG. 7I is a perspective view from the rear of the cross bar showing elements of the header tube clamp assembly 60 and particularly the back tracking plate affixed to the crossbar between the tracking plates.

FIG. 7I is a rear perspective view of the mid-section 180 of the crossbar 170 showing the back side of the header tube clamp assembly 60. In this view, the rear release platform 67 is shown in contact with the back tracking plate 194 which is affixed and contacts the center portion of the crossbar 180 and is located between the first and second tracking plates 189 and 190. The release cable 70 is seen descending through the groove in the rear release platform 67. Portions of the J-hook 72 and the release guide 68 can be seen through the oval opening in the center of the rear release platform 67.

Figure 7J:
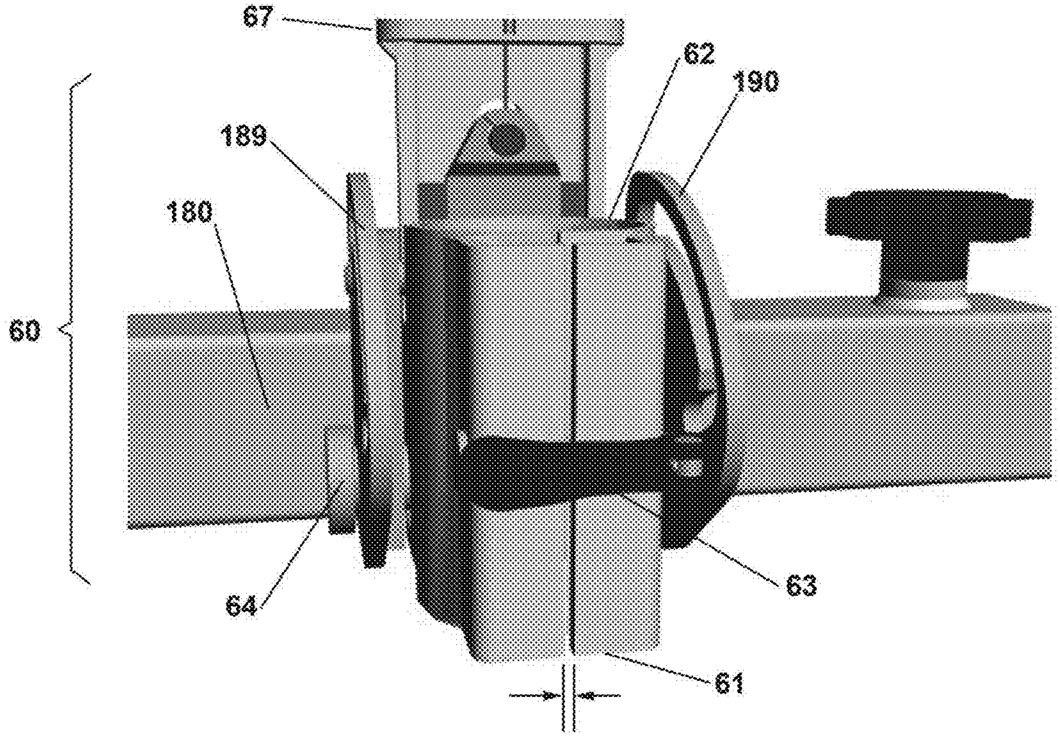
FIG. 7J is a perspective view of the header tube clamp assembly showing the cut cylinder and the closing extension affixed to the front of the cut cylinder and the clamp handle pivotally affixed to the closing extension in the closed position.

FIG. 7J is a perspective view of the header tube clamp assembly 60 showing the cut cylinder 62 and the closing extension 61 affixed to the front of the cut cylinder 61 and the clamp handle 63 pivotally affixed to the closing extension 61 where the clamp handle is in the closed position resulting in closure of the cut cylinder 62 and further resulting in securing the header tube clamp assembly 60 at a selected position on the header tube 50.

Figure 7K:
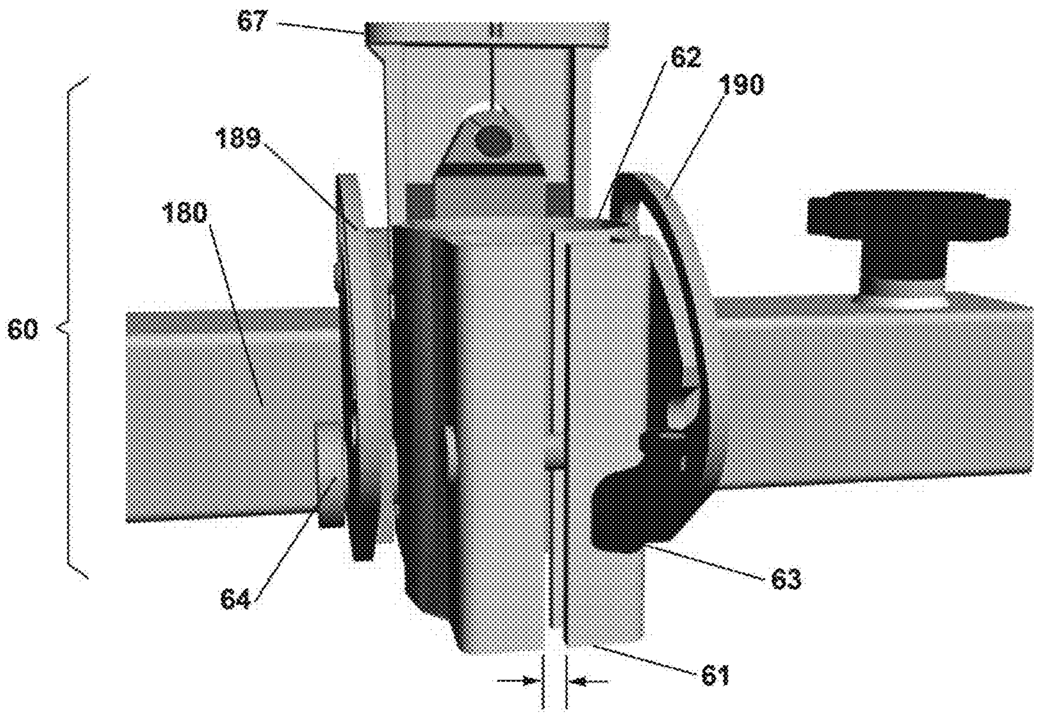
FIG. 7K is a perspective view of the header tube clamp assembly showing the cut cylinder and the closing extension affixed to the front of the cut cylinder and the clamp handle pivotally affixed to the closing extension in the open position.

FIG. 7K is a perspective view of the header tube clamp assembly 60 showing the cut cylinder 62 and the closing extension 61 affixed to the front of the cut cylinder 61 and the clamp handle 63 pivotally affixed to the closing extension 61 where the clamp handle 63 is in the open position thereby opening the gap in the closing extension 61 and subsequently opening the gap in the cut cylinder 62 allowing the header tube clamp assembly 60 to slide along the header tube 50 and assume different position.

Figure 8A:
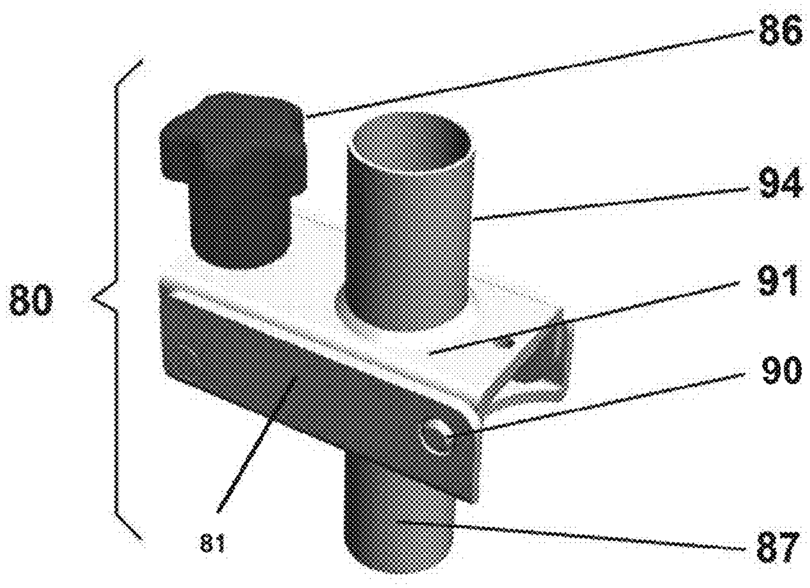
FIG. 8A is a perspective view of the upper tilting assembly in the closed position.
Figure 8B:
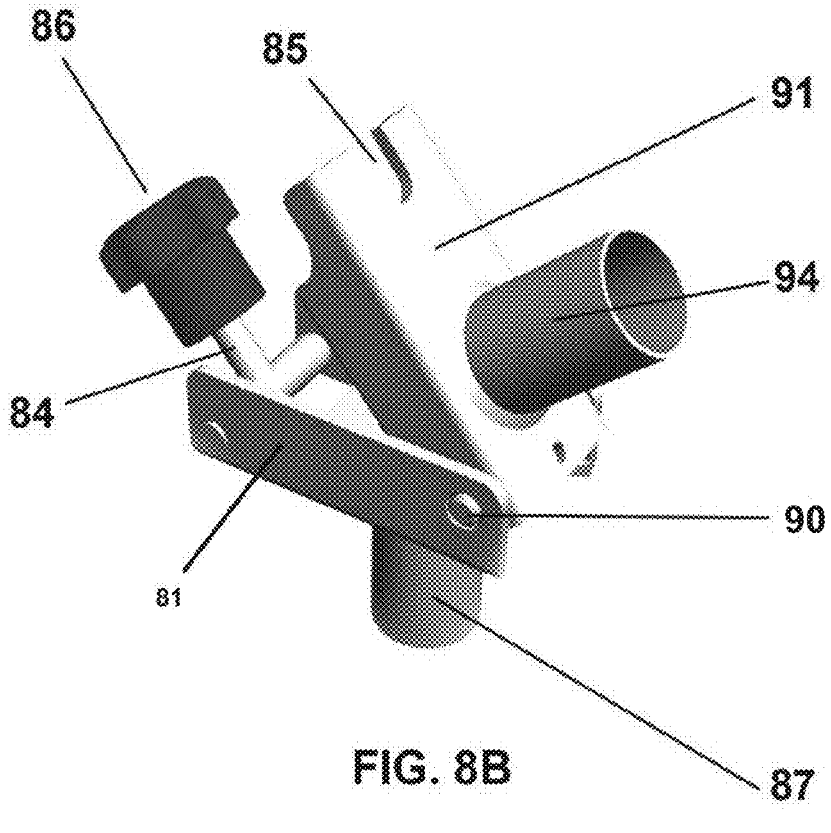
FIG. 8B is a perspective view of the upper tilting assembly in the open position whereupon the upper portion of the steering column may rotate.

FIG. 8A is a perspective view of the upper tilting assembly 80 in the closed position. This assembly comprises an upper platform 91 with a cylindrical portion 94 extending upward and orthogonally from the surface of the upper platform 91, a lower platform 81 with a similar cylindrical portion 87 extending downward and orthogonally from the lower platform 81 and a control knob 86 connected to a T-pin 84 which is shown in FIG. 8B. The upper tilt pivot pin 90 acting as an effective hinge and which traverses from side to side of the lower platform 81 through accommodating openings in the bottom platform 81. The upper platform 91 is also shown in FIG. 8B. The cylindrical portion 94 meets and inserts into the bottom of the steering mechanism extension tube 95 shown in FIGS. 9A, B, C, and D. The steering mechanism extension tube 95 is secured coaxially on the cylindrical portion 94 by a cylindrical clamp 93 also shown in FIGS. 9A, B, C, and D.

FIG. 8B is a perspective view of the upper tilting assembly 80 in the open position displaying the T-shape clamping pin 84 whose cross bar traverses openings in the bottom platform 81 and whose shaft controls rotation of the clamping pin 84 to meet the U-shape opening 85 in the upper platform 91 thus closing and locking the lower and upper platforms 81 and 91 of the tilting assembly 80. The knurled control knob 86 is threadably connected to the shaft of the T-pin 84 and may be tightened against the upper platform 91 to secure the assembly 80 in the closed position or may be unscrewed and loosened so that the T-pin 84 may swing and allow opening of the lower 81 and upper 91 platforms.

Figures 9A, 9B:
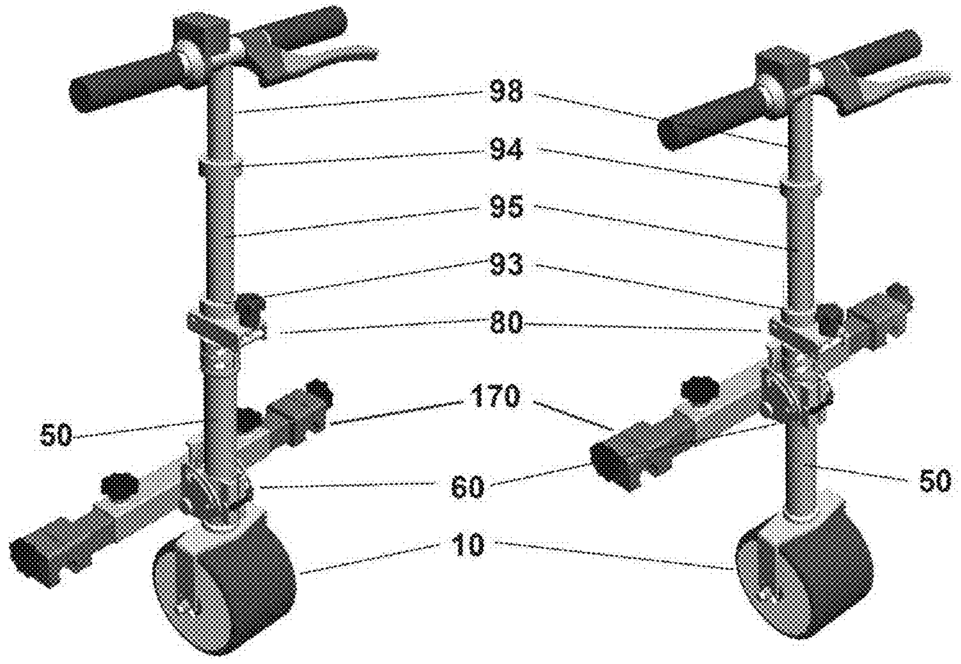
FIGS. 9A and 9B are perspective views of the apparatus where

FIGS. 9A and 9B illustrate movement of the header clamp assembly 60 along the header tube 50. FIG. 9A shows the header clamp assembly 60 and the crossbar 170 in a low position secured to a lower portion of the header tube 50. FIG. 9B shows the header clamp assembly 60 and the crossbar 170 elevated toward the top of the header tube 50. Other elements of the disclosed apparatus are provided for reference.

Figures 9C, 9D:
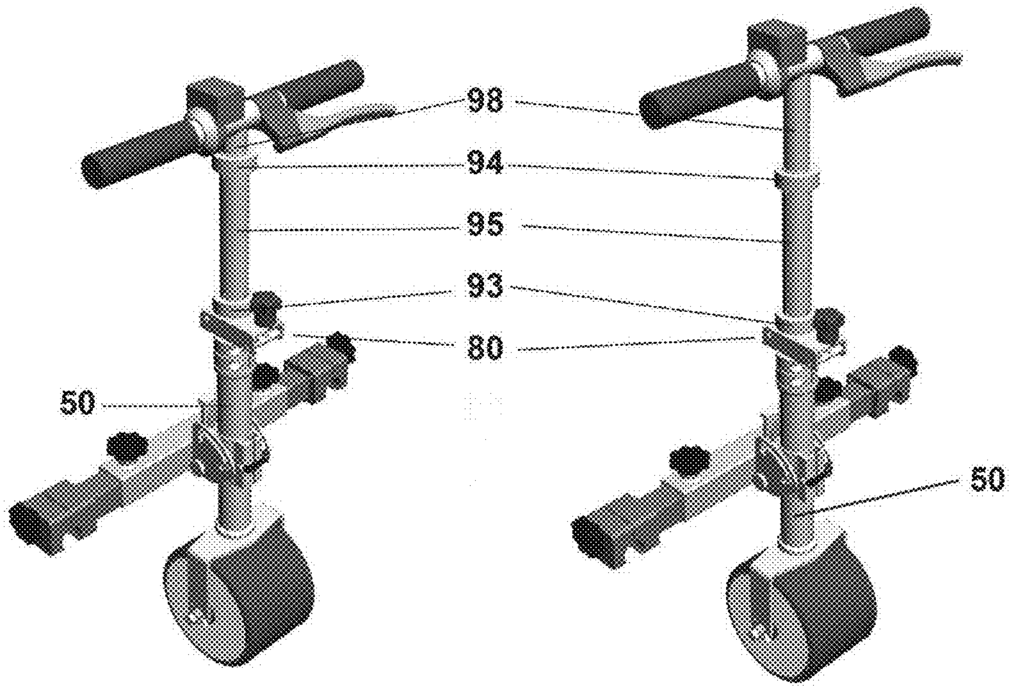
FIGS. 9C and 9D are perspective view of the apparatus where

FIGS. 9C and 9D illustrate movement of the steering mechanism extension shaft 98 in the steering mechanism extension tube 95 to vary the length of the steering column.

FIG. 9C shows the steering mechanism extension shaft 98 almost fully inserted into the extension tube 95. The position of the extension shaft is secured by the cylindrical clamp 94.

Figures 10A, 10B, 10C, 10D:
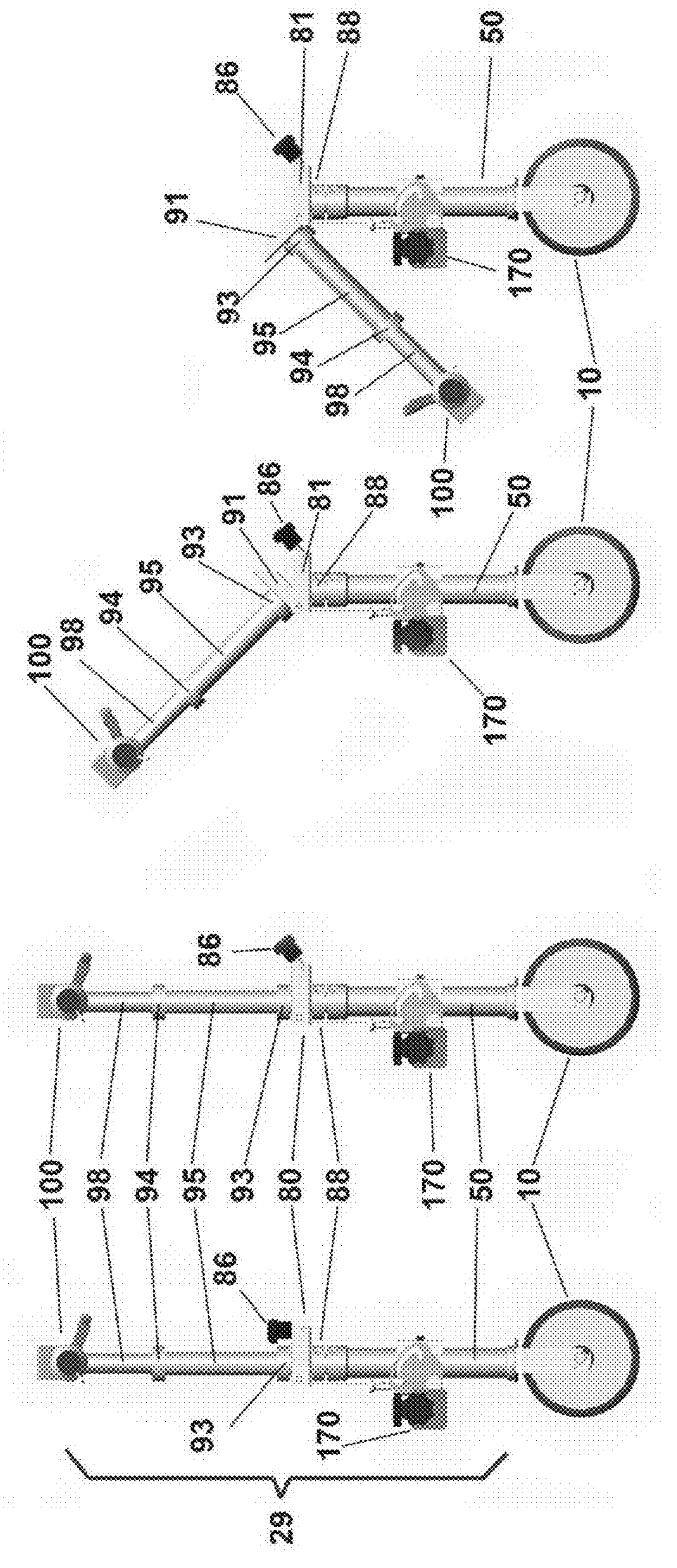
FIGS. 10A, B, C, and D are multiple views of the disclosed apparatus where the upper tilt/pivot assembly is joined rotatably and telescopically to the top section of the steering column and the top section of the steering column is rotated in various positions toward the user of the wheel chair.

FIGS. 10A, B, C, and D is a set of side views of the disclosed apparatus 5 showing the steering column 29 in various positions and where the upper tilt/pivot assembly 80 is joined rotatably and extendably to the steering extension shaft 98 which is the top section of the steering column, the tilt assembly is opened using the knurled knob 86 controlling the rotation of the clamping lever which rotates the clamping pin 84 to release the top section of the upper tilt assembly 91 thus enabling rotation of the handlebar assembly 100 and the handlebar extension 98 to the various positions displayed. The clamp 88 securing the bottom platform 81 of upper tilt assembly 80 to the top of the steerer tube 30 and the clamp 94 securing the handlebar extension 98 to the upper platform 91 of the upper tilt assembly 80 are also shown in the sequence in FIG. 9.

Figure 11A:
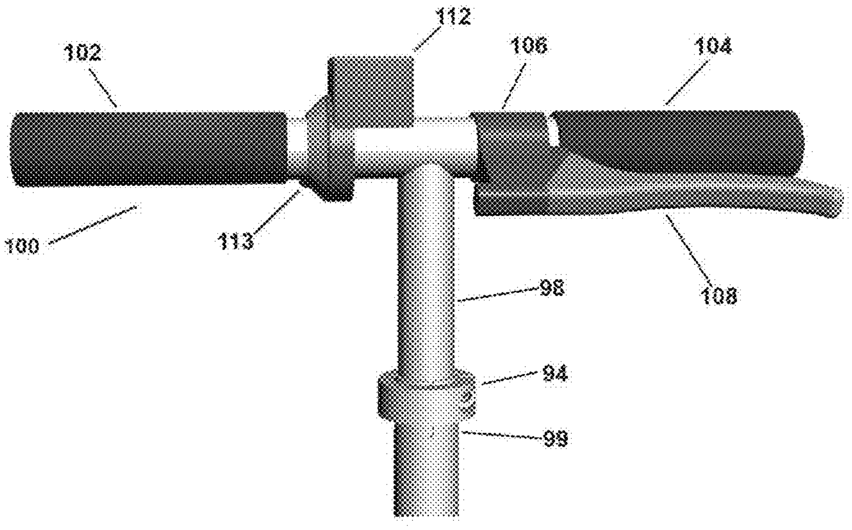
FIG. 11A is a front view of the handlebar assembly of the preferred embodiment with the steering mechanism extension shaft with its top end orthogonally affixed to the center of the handlebar assembly descending coaxially into the steering mechanism extension tube which and with a clamp used to secure the steering mechanism extension shaft in the steering mechanism extension tube thus adjusting the length of this portion of the steering column.

FIG. 11A is a view of the steering mechanism assembly 100 which, in the preferred embodiment, comprises first and second handlebars 102 and 104. The steering mechanism extension shaft 98 is shown with its top end orthogonally affixed to the center of steering mechanism assembly 100 and with a cylindrical clamp 94 used to secure the steering extension shaft 98 in position on the steering extension tube 95. The first 102 and second 104 handlebars are shown with the brake platform 106 and brake handle 108 shown attached to the second handlebar 104. The controller 110 (shown in FIG. 12) is affixed to the handlebar extension shaft 98 and electrically connected with lead 122 to the control assembly 112 comprising the throttle 113, the forward/reverse toggle button 114 (shown in FIG. 11B) and battery life meter 124 (shown in FIG. 11B).

Figure 11B:
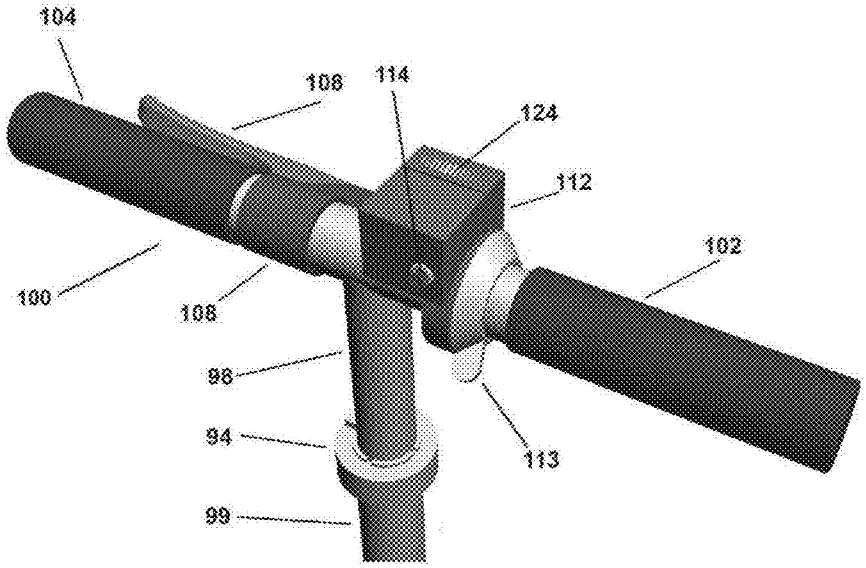
FIG. 11B is a perspective view of the handlebar assembly showing additionally the throttle adjoining the controller assembly, the battery power indicator as part of the controller assembly, the controller, the brake handle and brake platform, the steering mechanism extension shaft descending into the steering mechanism extension tube and the clamp securing this combination. Beltway

FIG. 11B is a perspective view of the steering mechanism 100, which as show in this figure is the preferred embodiment, the handlebars 102 and 104, the forward/reverse toggle button 114, the control assembly 112, the throttle lever 113 and the battery life meter 124. For reference, the steering mechanism extension shaft 98, the cylindrical clamp 94 and the steering mechanism extension tube 95 are also shown.

Figure 12:
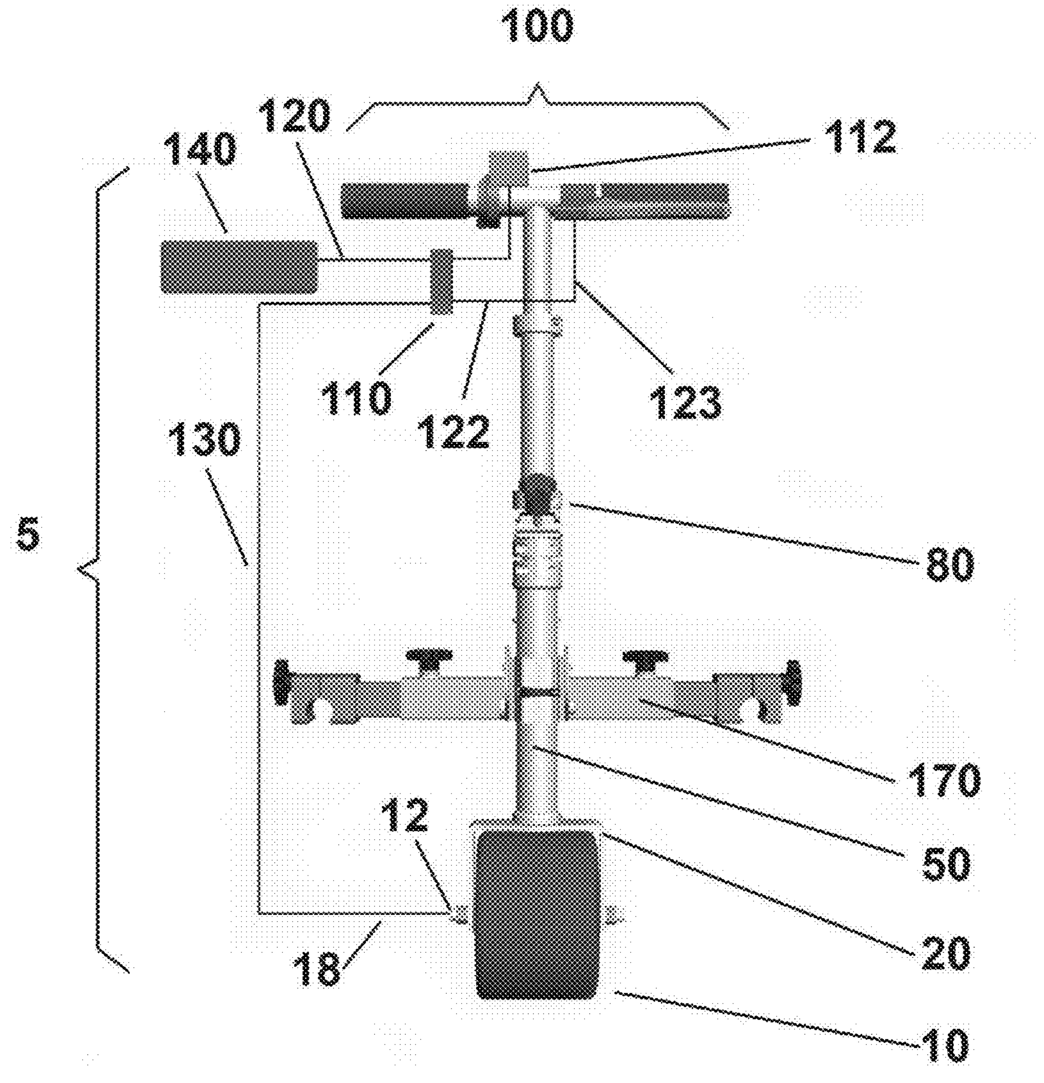
FIG. 12 is a view of the disclosed apparatus including the battery, the controller and electrical connections.

FIG. 12 is a schematic view of the disclosed apparatus showing the battery 140, the electrical lead from the battery 140 to the controller 110 which is shown separate from the steering mechanism extension shaft. It will be apparent to those skilled in the art that the controller may be affixed to the steering mechanism and the battery may be located in various positions on the wheelchair. Additionally, the electrical lead 120 from the battery 140 to the controller 110, the electrical lead 122 from the controller 110 to the motion control assembly 111 (throttle/meter/motion toggle button), the electrical lead 123 from the brake through the controller 110 and thence to the wheel driver 114 hub 10 to initiate electrical braking are also shown. In the preferred embodiment, the electrical power to drive the wheel driver hub is carried by electrical lead 130 which connects to electrical lead 18 which projects from the end of the wheel driver hub's 10 axle 12.

Figures 13A, 13B:
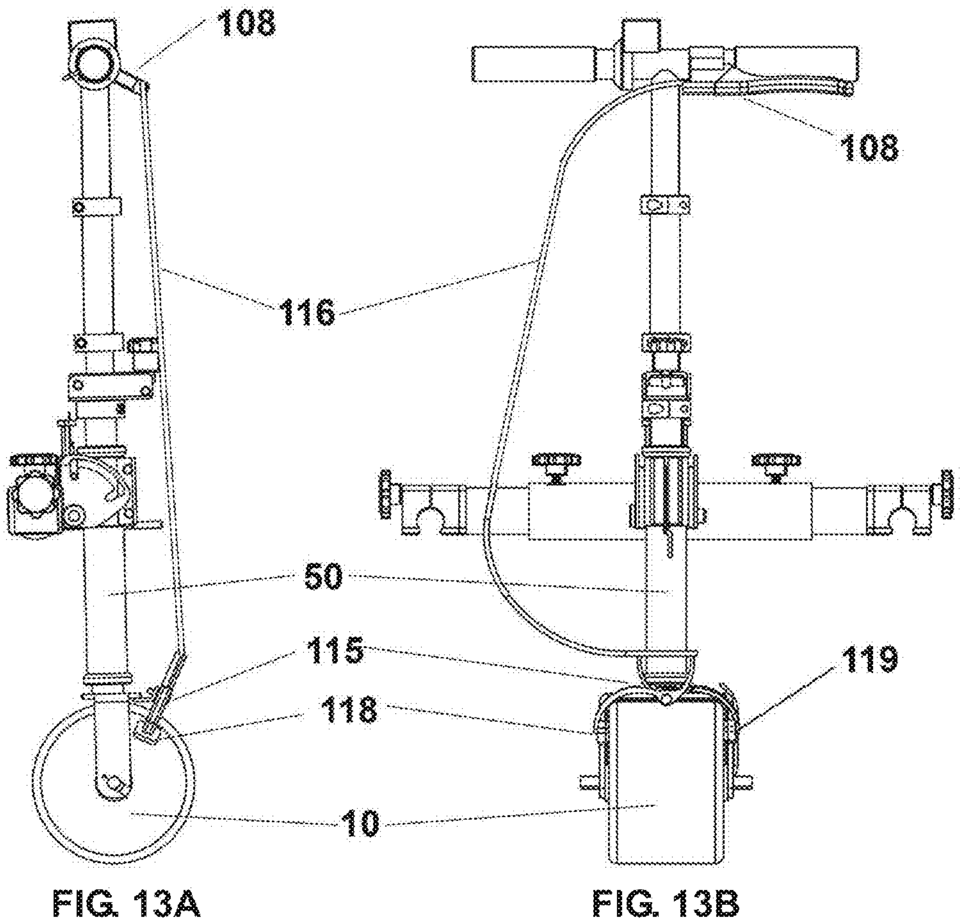
FIG. 13A is a side view of the disclosed apparatus displaying the brake assembly and the brake cable controlling the brake calipers on the wheel driver hub.
FIG. 13B is front view of the disclosed apparatus displaying the brake assembly and the brake cable controlling the brake calipers on the wheel driver hub.

FIGS. 13A and 13B are a side view and front view of an alternative embodiment of the disclosed apparatus 5 displaying a mechanical brake 108, and a brake cable 116 controlling a brake caliper assembly 115 further controlling a first and second brake caliper 118 and 119 on the wheel driver hub 10. Those skilled in the art will recognize that the mechanical braking system may be substituted for or added to the electrical braking system previously described. Alternatively, the mechanical braking system may be utilized in the alternative embodiment utilizing a wheel driven by an external motor as shown in FIGS. 14A and 14B.

Figure 14:
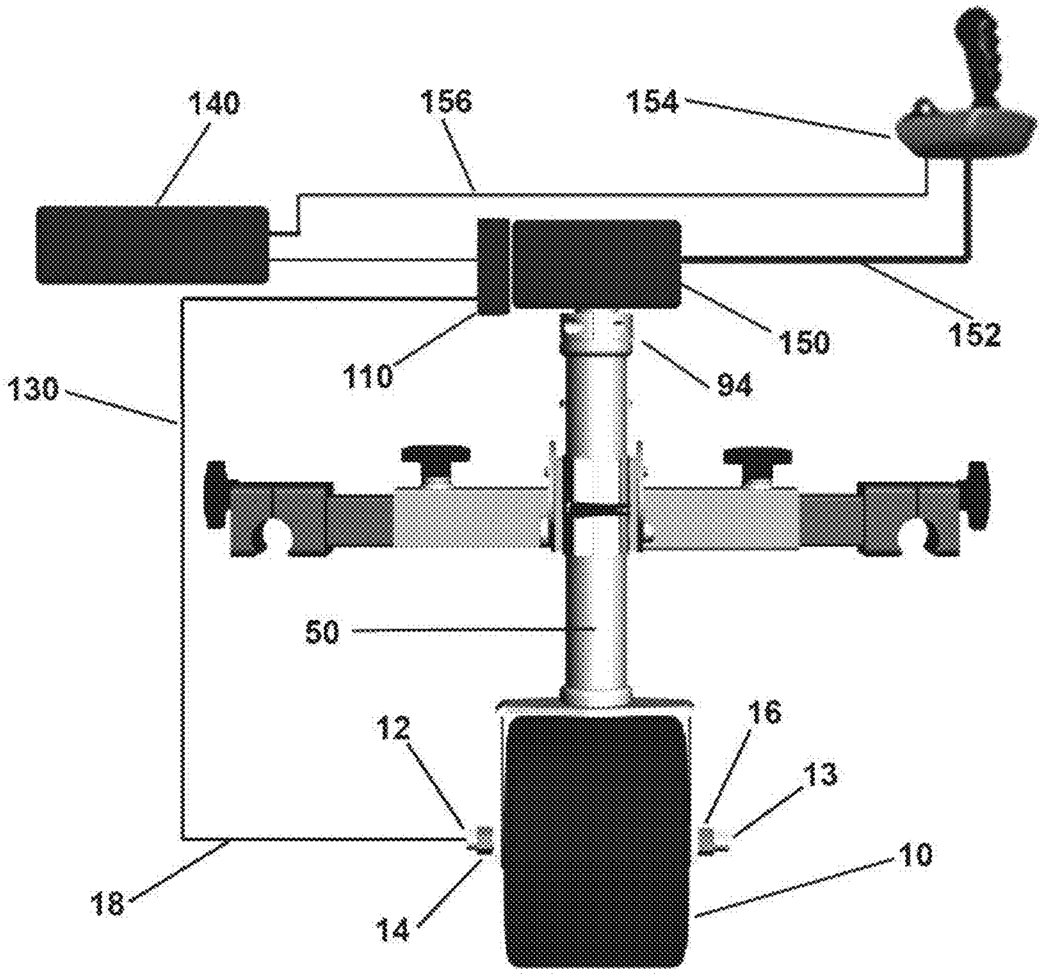
FIG. 14 shows an alternative embodiment where the wheelchair with the disclosed apparatus attached is controlled by a human interface device such as a joy-stick. In this embodiment, the handlebars are replaced by a unit containing servo-mechanisms. The steering mechanism extension shaft extends downward from the servo-mechanism assembly.

FIG. 14 shows an alternative embodiment where the wheelchair with the disclosed apparatus 5 attached is controlled by a joy-stick 154 electrically connected by lead 152 to a plurality of servo-mechanisms 150 controlling direction and speed. The joy-stick 154 received power from the battery 140 via lead 156.

Figure 15:
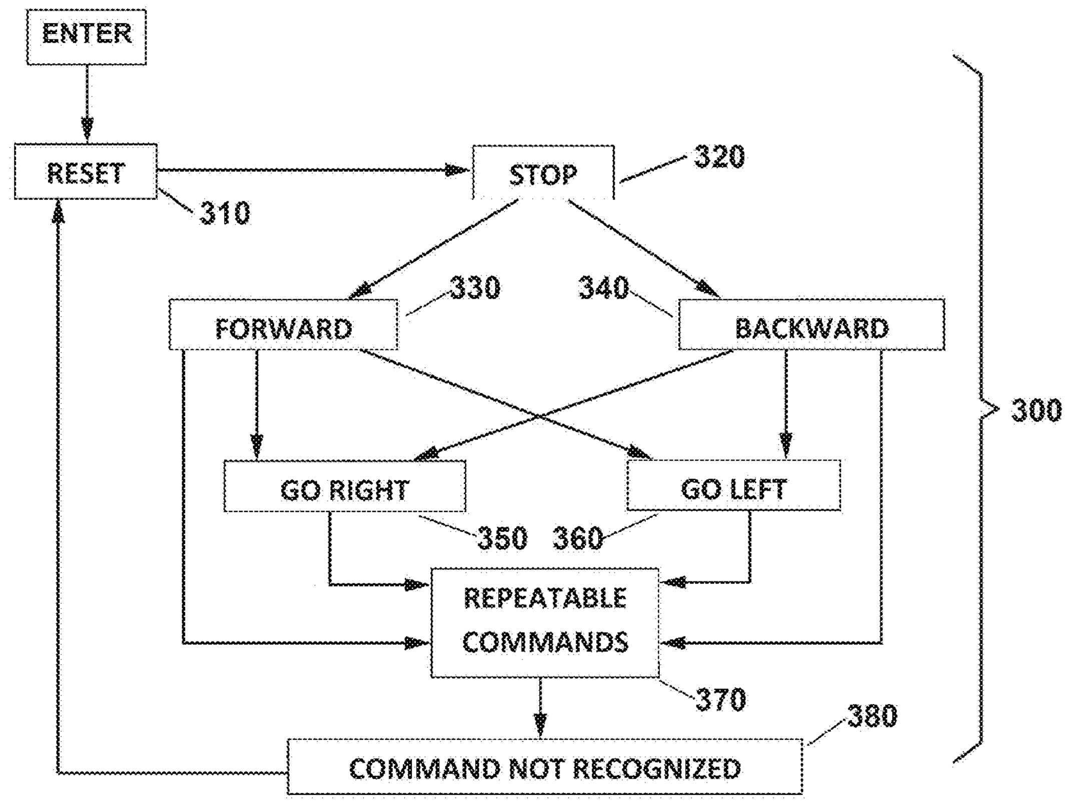
FIG. 15 is a flow chart showing the steps in using a human interface device such as a joy-stick, sip and puff, voice-activated commands or other external means to control speed and direction of the motion of the wheelchair with the disclosed apparatus attached.

FIG. 15 is a flow chart 300 schematically illustrating an electronic control system operable in accordance with the disclosed invention 5 with controlling commands opening with a reset of the logical construct 310 and further comprising a stop command for braking 320, steering direction further comprising forward 330 or backward 340 speeds and right turns 350 or left turns 360 of the wheel driver hub 10 or powered wheel 8. The control structure further comprises capacity for recognizing repeatable commands 370 and commands not recognized 380. If a command is not recognized, the logic proceeds to the reset command 310. The system illustrated includes the capability of stopping movement 380 if a command is not recognized. The flow chart 300 indicates the steps in generating commands using a human interface device such as a joy-stick, sip and puff, voice-activated commands or other external means to control speed and direction of the motion of the wheelchair 200.

The control system 300 interfaces with a controller 110 operated in conjunction with a command generator such as a joy-stick or other command generating device. The controller 110 in this case operates using commands from the command generator and operates the servo-mechanisms that control the direction of the wheel driver hub 10 or the powered wheel 8 and the forward or reverse generated. The controller 110 can be any device suitable for controlling the wheelchair. In general, any device capable of controlling the transfer of data to and from a number of nodes where such nodes emanate from the command generating device will suffice.

What is claimed is:

1. A propulsion apparatus attachable to an unpowered wheelchair enabling powered or manual operation of the wheelchair comprising:

(a) a crossbar adjustably extending across the wheelchair and affixable to frame members on the sides of the wheelchair;

(b) a steering column capable of first and second telescoping adjustments, pivotally connectable to the crossbar and rotatable in a vertical plane further comprising:

(i) steering means at the upper end of the steering column to control the direction of a powered wheel rotatably placed at the lower end of the steering column, the steering means connected to a locked steering extension shaft; with the capability when unlocked of folding and rotating toward the wheelchair user and further comprising;

(ii) a hinged and lockable upper tilt assembly telescopically connected to the steering extension shaft and enabling the rotation of the steering extension shaft when unlocked;

(c) a battery supplying power to operate the apparatus;

(d) a controlling means attached to the steering means and enabling distribution of power from the battery and routing electrical signals to and from command devices further comprising;

(i) a battery power life indicator integrated with the controller;

(ii) a throttle acting as first command means providing regulation of electrical power transmitted to the electrically powered wheel to control wheel rotational direction and speed;

(iii) a signaler capable of providing a first signal to a power source driving the powered wheel attached to the lower end of the steering column where the first signal causes the wheel to rotate forward and providing a second signal to the power source causing the wheel to rotate in the reverse direction;

(e) a braking means configured as part of the steering mechanism to control the speed of the powered wheel;

(f) a header tube clamp assembly concentrically configured around the lower portion of the steering column and telescopically affixable to the header tube located at the lower end of the steering column and pivotally connectable to the crossbar and enabling rotation of the steering column in a vertical plane;

(g) an electrically powered wheel rotatable around a central axle with the ends of the axel fixed at the ends of the steering fork branches on the lower portion of the steering column.

2. The apparatus of claim 1 wherein the electrically powered wheel is a wheel driver hub with an internal motor capable of forward and reverse speeds.

3. The apparatus of claim 1 wherein the electrically powered wheel is driven by an external electric motor on the steering column.

4. The apparatus of claim 3 wherein the electric motor axle is fractionally connected to the driven wheel.

5. The apparatus of claim 3 wherein the electric motor is connected to the driven wheel by a drive belt.

6. The apparatus of claim 1 wherein the steering means is a handlebar set mounted orthogonally at the top of the steering column.

7. The apparatus of claim 1 wherein the steering mechanism and speed controls are governed by servo-mechanisms attached to the steering column.

8. The apparatus of claim 5 wherein the motive input commands to the servo-mechanisms are provided by one device selected from the group consisting of an integral joy-stick;

a modular joy-stick;

a wheelchair chin control;

a wheelchair RIM (head) control;

a finger wheelchair drive control;

a touch pad wheelchair drive control;

a sip'n'puff wheelchair drive control.

9. The apparatus of claim 5 wherein the commands for motion and steering are provided to the servo-mechanism by remote radio control.

* * * * *